US010853913B2

United States Patent
Chuang et al.

(10) Patent No.: US 10,853,913 B2
(45) Date of Patent: Dec. 1, 2020

(54) COLOR FILTER ARRAY PATTERN CONVERSION

(71) Applicant: QUALCOMM Incorporated, San Diego, CA (US)

(72) Inventors: Shang-Chih Chuang, San Diego, CA (US); Jing Wang, Milpitas, CA (US); Xiaoyun Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/298,793

(22) Filed: Mar. 11, 2019

(65) Prior Publication Data

US 2020/0294191 A1 Sep. 17, 2020

(51) Int. Cl.
*G06T 3/40* (2006.01)
*G06T 11/00* (2006.01)
*G02B 5/20* (2006.01)
*H04N 9/04* (2006.01)

(52) U.S. Cl.
CPC ............ *G06T 3/4015* (2013.01); *G02B 5/201* (2013.01); *G06T 11/001* (2013.01); *H04N 9/04515* (2018.08); *H04N 2209/046* (2013.01)

(58) Field of Classification Search
CPC ..... G06T 3/4015; G06T 11/001; G02B 5/201; H04N 9/04515; H04N 2209/046; H04N 2209/045–046; H01L 27/14621; G02F 2001/136222
USPC .......................................................... 348/273
See application file for complete search history.

(56) References Cited

U.S. PATENT DOCUMENTS

| 2017/0048500 | A1* | 2/2017 | Shi ........................ H04N 5/379 |
| 2018/0308217 | A1* | 10/2018 | Kurita ................ H04N 9/04551 |
| 2019/0123075 | A1* | 4/2019 | Morestin ................... G01S 1/00 |
| 2019/0260974 | A1* | 8/2019 | Kaizu .................... H04N 5/225 |

* cited by examiner

*Primary Examiner* — Lin Ye
*Assistant Examiner* — Chan T Nguyen
(74) *Attorney, Agent, or Firm* — Holland & Knight LLP

(57) ABSTRACT

Methods, systems, and devices for processing color information are described. The method may include receiving a first set of image data collected at an image sensor based on a first color filter array having a first filter pattern, calculating a color saturation gradient based on the first set of image data, and calculating multiple color gradients based on the color saturation gradient. The multiple color gradients may each be associated with a region of the first set of image data, where each color gradient characterizes a color variation along a different direction of the region. The method may include generating a second set of image data including a color value for the region based on comparing a first direction gradient of the multiple color gradients with a second direction gradient of the multiple color gradients. Color values associated with the regions may be mapped to a second color filter array.

20 Claims, 12 Drawing Sheets

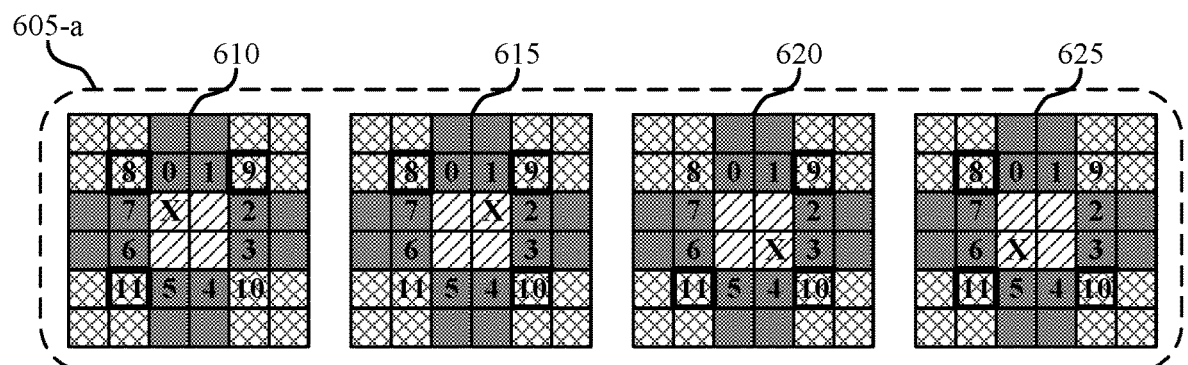
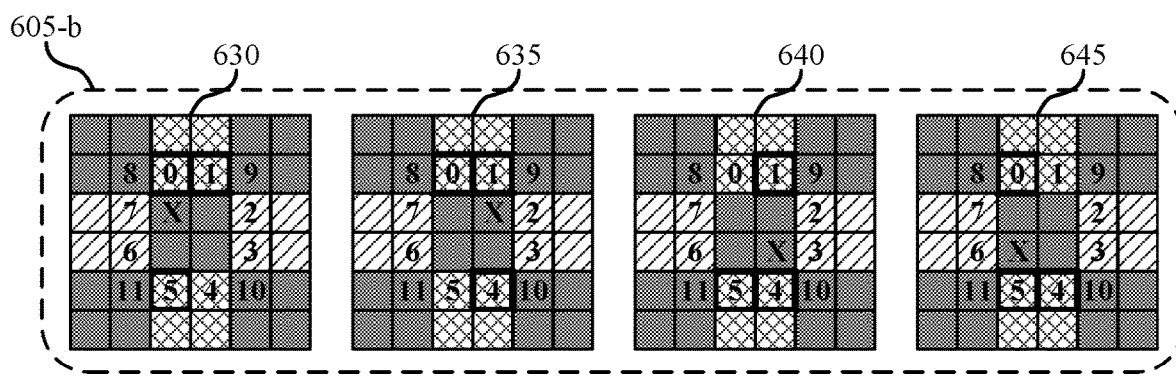
■ First Color
╱ Second Color
⊠ Third Color
FIG. 6

COLOR FILTER ARRAY PATTERN CONVERSION

BACKGROUND

The following relates generally to processing color information, and more specifically to techniques for image processing.

Image signal processing (ISP) may refer to a field of image processing for image collection devices such as digital cameras. An ISP device may be configured to determine color information associated with an image. In some cases, light detection components such as photodiodes in an image sensor may only be able to detect light intensity with little or no wavelength specificity. Color information may be obtained by using color filters with an image sensor. For example, a color filter array (CFA) that includes a pattern or mosaic of different color filters may be placed over an image sensor to capture color information. A common CFA is a Bayer filter, which includes a repeating pattern of red, green and blue (RGB) color filters. The Bayer filter pattern uses 2 green color filters for each red and blue color filter (i.e., 50% green, 25% red and 25% blue), which is based on the physiology of the human eye. Accordingly, the ISP techniques employed at an image collection device are based on the type of CFA used by the image collection device.

Many conventional ISP devices are configured to only support a Bayer CFA. However, other CFA patterns are possible, which may provide different image outputs, decrease the image processing overhead or otherwise improve or increase the efficiency of ISP. For example, an X-Trans CFA pattern may minimize moiré effects and increase resolution by eliminating the need for a low-pass filter. Additionally or alternatively, a quad color filter array (QCFA) utilizes a CFA pattern in which every two-by-two pixel array has the same color. The QFCA pattern may promote more flexible processing of the image sensor data, for example based on the light conditions of acquired image data. Accordingly, ISP devices may benefit from image processing techniques that allow the application of different CFA patterns to conventional ISP devices (e.g., devices that only support a Bayer CFA).

SUMMARY

The described techniques relate to improved methods, systems, devices, and apparatuses that support techniques for image processing. Generally, the described techniques provide for processing image data collected using a first CFA (e.g., a QCFA) and sampling or remosaicing the color data from the first CFA pattern to a second CFA pattern (e.g., Bayer). In this regard, different CFA patterns can be used to collect image data at an ISP device that only supports processing for a single CFA pattern (e.g., Bayer pattern). In line with the present disclosure, performing a directional interpolation to estimate pixel values may lead to more accurate interpolation results.

A method of processing color information is described. The method may include receiving a first set of image data collected at an image sensor based on a first color filter array (CFA) associated with the image sensor, the first CFA including a first filter pattern, calculating a color saturation gradient based on the first set of image data, calculating multiple color gradients based on the color saturation gradient, the multiple color gradients each associated with a region of the first set of image data, where each color gradient characterizes a color variation along a different direction of the region, generating a second set of image data including a color value for the region based on comparing a first direction gradient of the multiple color gradients with a second direction gradient of the multiple color gradients, and mapping the color value associated with the region to a third set of image data associated with a second CFA.

An apparatus for processing color information is described. The apparatus may include a processor, memory in electronic communication with the processor, and instructions stored in the memory. The instructions may be executable by the processor to cause the apparatus to receive a first set of image data collected at an image sensor based on a first color filter array (CFA) associated with the image sensor, the first CFA including a first filter pattern, calculate a color saturation gradient based on the first set of image data, calculate multiple color gradients based on the color saturation gradient, the multiple color gradients each associated with a region of the first set of image data, where each color gradient characterizes a color variation along a different direction of the region, generate a second set of image data including a color value for the region based on comparing a first direction gradient of the multiple color gradients with a second direction gradient of the multiple color gradients, and map the color value associated with the region to a third set of image data associated with a second CFA.

Another apparatus for processing color information is described. The apparatus may include means for receiving a first set of image data collected at an image sensor based on a first color filter array (CFA) associated with the image sensor, the first CFA including a first filter pattern, calculating a color saturation gradient based on the first set of image data, calculating multiple color gradients based on the color saturation gradient, the multiple color gradients each associated with a region of the first set of image data, where each color gradient characterizes a color variation along a different direction of the region, generating a second set of image data including a color value for the region based on comparing a first direction gradient of the multiple color gradients with a second direction gradient of the multiple color gradients, and mapping the color value associated with the region to a third set of image data associated with a second CFA.

A non-transitory computer-readable medium storing code for processing color information is described. The code may include instructions executable by a processor to receive a first set of image data collected at an image sensor based on a first color filter array (CFA) associated with the image sensor, the first CFA including a first filter pattern, calculate a color saturation gradient based on the first set of image data, calculate multiple color gradients based on the color saturation gradient, the multiple color gradients each associated with a region of the first set of image data, where each color gradient characterizes a color variation along a different direction of the region, generate a second set of image data including a color value for the region based on comparing a first direction gradient of the multiple color gradients with a second direction gradient of the multiple color gradients, and map the color value associated with the region to a third set of image data associated with a second CFA.

In some examples of the method, apparatuses, and non-transitory computer-readable medium described herein, calculating the color saturation gradient further may include operations, features, means, or instructions for determining an average color value within a kernel for a first color, a second color, a third color or a combination thereof.

In some examples of the method, apparatuses, and non-transitory computer-readable medium described herein, calculating the multiple color gradients further may include operations, features, means, or instructions for determining a first interpolation direction based on calculating a first color gradient along a first direction and a second color gradient along a second direction, determining a second interpolation direction based on calculating a third color gradient along a third direction and a fourth color gradient along a fourth direction, and calculating a direction weight based on the first color gradient, the second color gradient, the third color gradient, the fourth color gradient, or a combination thereof.

In some examples of the method, apparatuses, and non-transitory computer-readable medium described herein, generating the second set of image data further may include operations, features, means, or instructions for calculating the color value for a first color associated with the region based on a first set of color values along the first interpolation direction, a second set of color values along the second interpolation direction and the direction weight.

In some examples of the method, apparatuses, and non-transitory computer-readable medium described herein, generating the second set of image data further may include operations, features, means, or instructions for calculating a second color value for a second color associated with the region based on a third set of color values along the first interpolation direction.

Some examples of the method, apparatuses, and non-transitory computer-readable medium described herein may further include operations, features, means, or instructions for calculating a flatness value associated with the region based on comparing the first color gradient, the second color gradient, the third color gradient, the fourth color gradient, or a combination thereof, defining whether the region may be in a flat area based on comparing the flatness value to a flatness threshold, and generating the color value for the region based on determining the region may be in a flat area.

Some examples of the method, apparatuses, and non-transitory computer-readable medium described herein may further include operations, features, means, or instructions for performing a non-directional interpolation for the region based on determining that the flatness value may be less than the flatness threshold.

Some examples of the method, apparatuses, and non-transitory computer-readable medium described herein may further include operations, features, means, or instructions for non-directional interpolation includes averaging values of pixels for a first color within a kernel.

In some examples of the method, apparatuses, and non-transitory computer-readable medium described herein, the mapping may be based on a filter color of the second CFA associated with the region.

In some examples of the method, apparatuses, and non-transitory computer-readable medium described herein, the second CFA may be a Bayer pattern, and mapping the color value associated with the region to the third set of image data further may include operations, features, means, or instructions for interpolating a first color value, a second color value, a third color value, or a combination thereof associated with the region to the third set of image data based on the filter color of the Bayer pattern.

Some examples of the method, apparatuses, and non-transitory computer-readable medium described herein may further include operations, features, means, or instructions for outputting the third set of image data as a Bayer pattern CFA, where each region of the third set of image data includes a color value corresponding to a color specified for that region by the Bayer pattern CFA.

BRIEF DESCRIPTION OF THE DRAWINGS

FIG. 2 through 6 show diagrams illustrating methods, devices and components that support techniques for image processing in accordance with aspects of the present disclosure.

DETAILED DESCRIPTION

Figure 1:
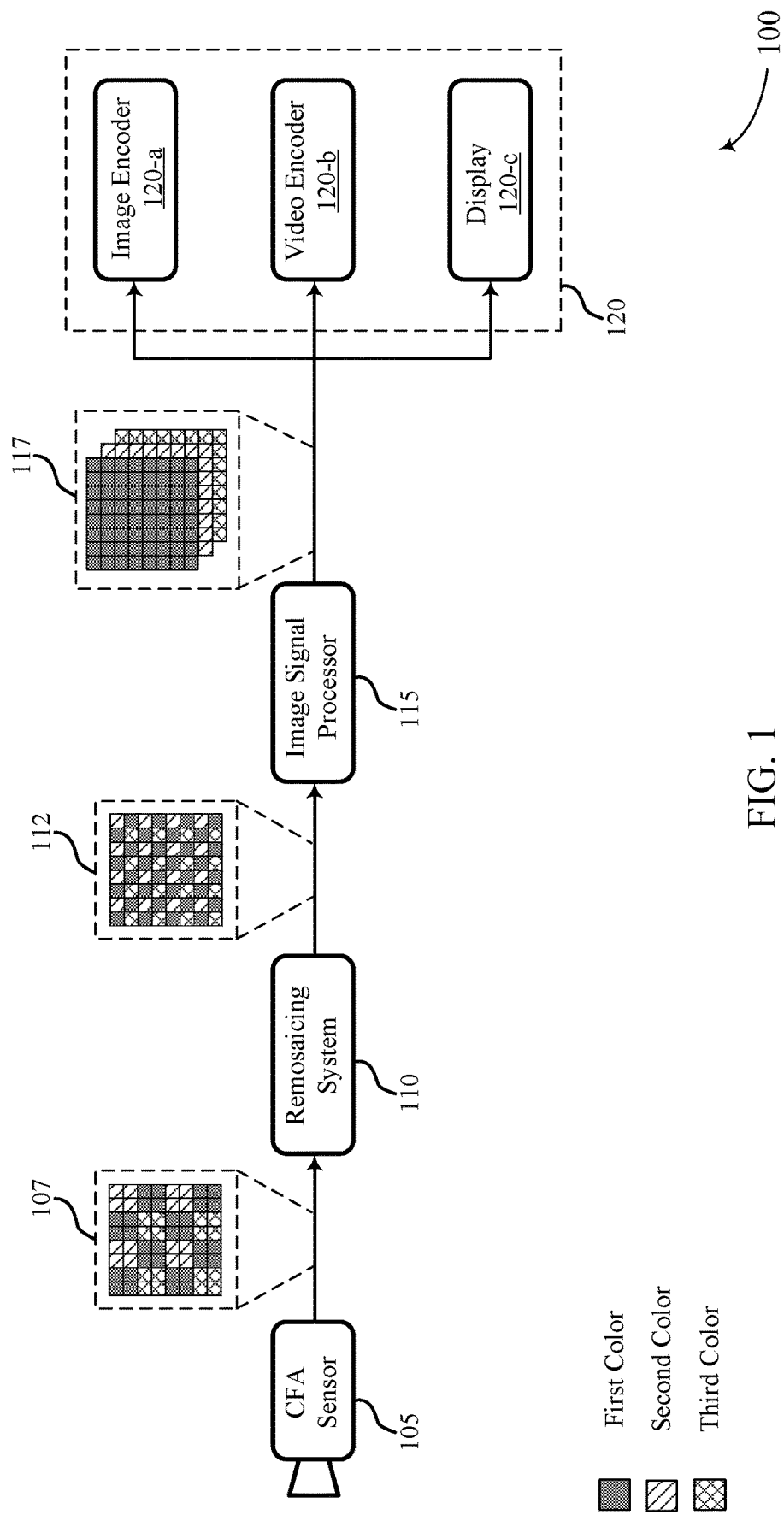
FIG. 1 illustrates an example of a system for processing color information that supports techniques for image processing in accordance with aspects of the present disclosure.

An image signal processing (ISP) device may include a camera with one or more image sensors for collecting image data (e.g., a photograph(s), video, or the like). In some cases, the image sensor may primarily be capable of collecting light intensity with little or no wavelength specificity. Accordingly, an ISP device may have a color filter array (CFA) for determining color information for the captured image data. Many conventional ISP device only support image color processing for a Bayer CFA pattern. However, other CFA patterns may be desired, for example, a QCFA pattern may be desirable for allowing greater flexibility in image processing techniques based on the conditions (e.g., lighting conditions such as low light or bright light). For example, different color interpolation processes may be implemented using a QCFA pattern that improve interpolation accuracy, gradient detection, color saturation, or the like. Conventional ISP device that only support a single CFA pattern (e.g., Bayer pattern) reduce the flexibility and efficiency of a device.

The present techniques relate to a remosaicing processes including sampling or converting a first CFA pattern (e.g., QCFA) to a second CFA pattern (e.g., Bayer) that is supported by an ISP device. The present techniques include receiving a first set of image data collected at an image sensor using a first CFA pattern. For example, the first set of image data may include color values for each pixel associated with the first CFA pattern. Accordingly, each pixel may be assigned a single-color value (e.g., either red, blue or green) that corresponds to the color of the CFA pattern that is associated with that pixel. Thus, each pixel may not have a value defined for the other two-color values (e.g., two of the three RGB color values). These missing color values for each color may be estimated or determined from the surrounding color data for that color (e.g., a missing green pixel can be estimated based on the green pixel values determined from the CFA pattern) using an interpolation method. In cases where a Bayer CFA is utilized the interpolation method may be referred to as Bayer pattern demosaicing.

According to aspects of the present disclosure first interpolation method may be used to convert or sample a first CFA patter (e.g., QCFA) to a Bayer pattern. This first interpolation may be referred to as remosaicing, which allows image data obtained using a non-Bayer pattern CFA (e.g., QCFA, X-Trans, or the like) to be mapped to a Bayer CFA and then processed by an ISP device that supports Bayer pattern demosaicing.

Aspects of the present disclosure describe examples by utilizing directional conventions to promote clarity. Directional terms such as vertical, horizontal, diagonal and cross-diagonal relate to directions, locations, or view orientations of with respect to orientation of the figures provided herein. For example, the term "vertical" may refer to upward and downward directions with respect to the figures and the term "horizontal" may refer to directions going across the figure (e.g., perpendicular to the vertical direction). Similarly, the term "diagonal" may refer to a first non-vertical or non-horizontal direction, and the term "cross-diagonal" may refer to a second non-vertical or non-horizontal direction that may be substantially perpendicular to the diagonal direction. Reference to these directions is provided as one example, and the present disclosure is not intended to be limited to these referenced directions. The methods, techniques and systems presented herein may be implemented using a variety of directions, which may be different from the directions used herein to illustrate the concepts of the disclosure.

According to aspects of the invention a remosaicing technique may include a direction detection that is performed on the first set of image data to determine a color interpolation direction for estimating or calculating a missing color value. In some cases, this includes determining color gradients along a vertical direction and a horizontal direction to determine whether the horizontal color gradient or vertical color gradient is more dominant. Similarly, the direction detection may include determining color gradients along diagonal and cross-diagonal directions to determine whether the diagonal or cross-diagonal color gradient is more dominant. A color value for a pixel may then me estimated based on the dominant one of the horizontal or vertical color gradient, the dominant one of the diagonal or cross-diagonal color gradient, or a combination thereof.

In some cases, a flatness determination may be made for a region of the image data and a directional interpolation or non-directional interpolation may be performed based on the flatness determination. For example, if a value of the flatness determination satisfies a threshold, then a directional interpolation may be performed, such as described herein. If the value of the flatness determination fails to satisfy the threshold, then a non-direction interpolation may be performed. In some cases, a non-direction interpolation may be performed by averaging the color values for a specific color within a defined region.

Additionally or alternatively, a saturation evaluation may be performed. In some cases, this may include calculating a saturation value for a region of pixels of the first set of image data and using the saturation value to determine the interpolation direction. For example, a first set of color gradients (e.g., same channel gradient between pixels of the same color) may be used for more saturated pixels.

Aspects of the disclosure include sampling the results of the first CFA (e.g., QCFA) remosaicing procedure to a second CFA pattern (e.g., Bayer pattern). In some cases, this may include determining a Bayer pattern array by mapping an RGB color values for a pixel to a corresponding color value defined by the Bayer pattern. For example, where the Bayer pattern specifies a green pixel, the color value for this green pixel may be based on the measured or interpolated color value using the QCFA pattern. Accordingly, an ISP device that only supports Bayer sampling may process image data obtained from a different CFA pattern (e.g., QCFA, X-Trans, or the like).

Aspects of the disclosure are initially described in the context of a system for processing color information. Aspects of the disclosure are then described in the context of method flows and image processing techniques related to processing color information of collected image data. Aspects of the disclosure are further illustrated by and described with reference to apparatus diagrams, system diagrams, and flowcharts that relate to techniques for image processing.

FIG. 1 illustrates an example of an image processing system 100 that supports techniques for image processing in accordance with aspects of the present disclosure. The image processing system 100 includes a CFA sensor 105, a remosaicing system 110, an ISP 115, and processed image data input device 120. The image processing system 100 may operate to processing image data collected at the CFA sensor 105 and output processed digital image data for display. In the illustrated example, the CFA sensor 105 may be a camera including an image sensor that detects light to form an image. In some cases, the CFA sensor 105 may include a CFA or color filter mosaic to obtain color information for an image. The CFA may include a pattern of color filters placed over the image sensor to capture color information. In some cases, this may include a color filter being associated with each pixel sensor of an array. Accordingly, each pixel sensor may collect color data based on the color (e.g., RGB) of the filter that is associated with that pixel. Color images (e.g., RGB, YUV or the like) can be reconstructed using an interpolation method (e.g., demosaicing) to estimate or calculate the missing color values.

In some cases, the CFA sensor 105 may include a first CFA that is used to produce a first set of image data 107. For example, the first CFA may be a QCFA as pattern, which groups colors into a two-by-two pixel pattern where a first set of two-by-two pixel blocks have a first filter color (e.g., green), a second set two-by-two pixel blocks have a second filter color (e.g., red) and a third set of two-by-two pixel blocks have a third filter color (e.g., blue). Accordingly, color data obtained using the QCFA may have a the two-by-two QFCA color pattern. The color data may be used to produce a first set of image data 107, for example, having pattern of data including a first color (e.g., green), a second color (e.g., red) and a third color (e.g., blue) as illustrated in FIG. 1.

The first set of image data 107 may be processed by the remosaicing system 110 to produce a second set of image data (shown in FIG. 2), which includes interpolated values for each of the colors (e.g., a set of RGB image data). The second set of image data may be mapped or sampled to a second CFA pattern (e.g., Bayer) to produce a third set of image data 112, which may be processed by an ISP 115 to produce a final set of image data 117 (e.g., RGB image data set). The final set of image data 117 may be further processed, encoded or displayed by an image input device such as an image encoder 120-*a*, a video encoder 120-*b* or a display 120-*c*.

In some aspects, receiving a first set of image data collected at an image sensor based at least in part on a first color filter array associated with the image sensor, where the first CFA comprising a first filter pattern; calculating a color saturation gradient based on the first set of image data; calculating multiple color gradients on the color saturation gradient, where the multiple color gradients each associated with a region of the first set of image data, and where each color gradient characterizes a color variation along a different direction of the region; generating a second set of image data comprising a color value for the region based on comparing a first direction gradient of the multiple color gradients with a second direction gradient of the multiple color gradients; and mapping the color value associated with the region to a third set of image data associated with a second CFA, may allow ISP devices that only support a single type of CFA pattern (e.g., Bayer) be able to process image data collected via other CFA patterns (e.g., QCFA, X-Trans, etc.).

In some aspects, calculating the color saturation gradient by determining an average color value within a kernel for a first color, a second color, a third color or a combination thereof, may increase the efficiency of the interpolation procedure, for example, by performing lower computational procedures (e.g., non-directional interpolations for flat regions).

In some aspects, calculating the multiple color gradients by determining a first interpolation direction based on calculating a first color gradient along a first direction and a second color gradient along a second direction; determining a second interpolation direction based on calculating a third color gradient along a third direction and a fourth color gradient along a fourth direction; and calculating a direction weight on the first color gradient, the second color gradient, the third color gradient, the fourth color gradient, or a combination thereof, may increase the accuracy of the interpolation procedure along edges, color transitions, or the like.

Figure 2:
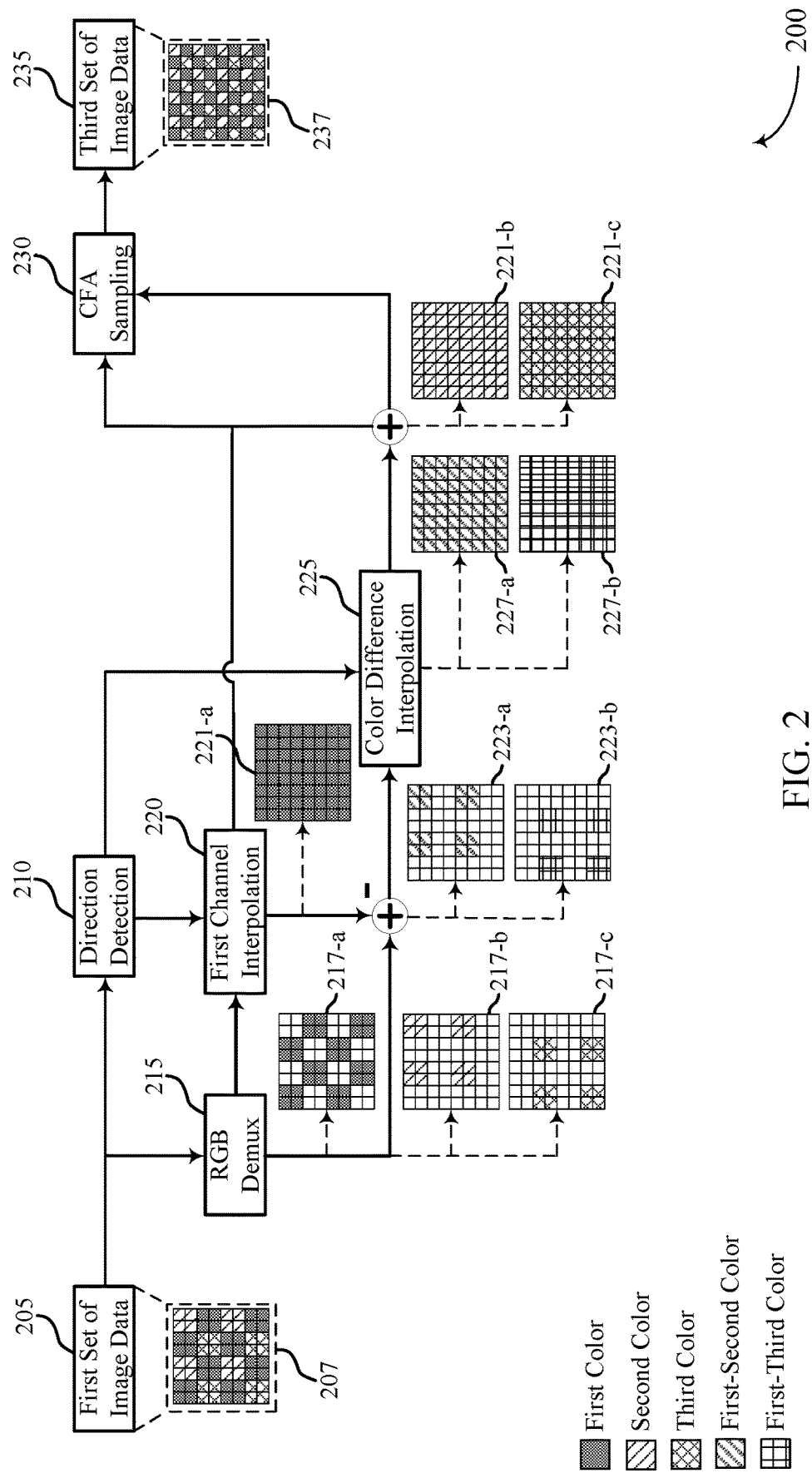

FIG. 2 illustrates an example of a block diagram for an image processing system 200 that supports techniques for image processing in accordance with aspects of the present disclosure. In some examples, image processing system 200 may implement aspects of image processing system 100. The image processing system 200 may be a remosaicing system, which may be an example of the remosaicing system 110 described with reference to FIG. 1. The image processing system 200 may receiving a first set of image data 205, which may include first CFA data 207. In some cases, the first CFA data 207 may be based on a first CFA pattern, for example, a QCFA as illustrated in FIG. 2, although other CFA patterns (e.g., X-Trans) are possible. The image processing system 200 may include a direction detection process 210, a RGB demultiplexer (demux) 215 for separating the different color data/channels, a first channel interpolation 220 and a color difference interpolation 225 for producing a second set of image data 221, and a CFA sampling procedure 230 to output a third set of image data 235. The third set of image data 235 may include second CFA data 237. In some cases, the second CFA data 237 may be based on a second CFA pattern, for example, a Bayer CFA pattern as illustrated in FIG. 2.

In some cases, the direction detection process 210 may be performed on the first set of image data 205 to determine one or more interpolation directions for performing an interpolation (e.g., remosaicing) procedure. The direction detection process 210 may include a saturation evaluation, a gradient calculation, a direction determination and weight calculation, and a flatness determination, which will be described in greater detail with respect to FIGS. 3-12. The flatness determination may be used to evaluate whether a region of the first CFA data 207 satisfies a flatness threshold. In some cases, if the flatness threshold is satisfied, then a non-directional interpolation process may be performed using the first CFA data 207. If the flatness threshold is not satisfied, then a directional interpolation process may be performed using the first CFA data 207. The non-directional interpolation may include averaging the color data from a region of the first CFA data 207. The directional interpolation process may include determining a dominant direction between a vertical direction and a horizontal direction a region of the first CFA data 207. In some cases, the directional interpolation process may also include determining a dominant direction between a diagonal direction and cross-diagonal direction for the region. In some cases, a gradient calculation between adjacent color data (e.g., color pixels) of the first CFA data 207 may be used to determine the dominant direction. Additionally or alternatively, the saturation evaluation may be used to weight or refine the gradient calculation.

In some cases, the RGB demux 215 may separate the different colors/color channels associated with the first CFA data 207. For example, the RGB demux 215 may receive the first CFA data 207 as an input and output a first color data set 217-$a$ (e.g., green color channel), a second color data set 217-$b$ (e.g., blue color channel) and a third color data set 217-$c$ (e.g., red color channel). In some cases, the first color data set 217-$a$ may include data for the color associated with the first CFA pattern. That is, the first color data set 217-$a$ may include color data for only the first color (e.g., green color data) at filter/pixel locations corresponding to the first color of the first CFA pattern. Accordingly, the first color data set 217-$a$ may not include color data for filter/pixel locations corresponding to the second color or third color. Similarly, the second color data set 217-$b$ may include color data for only the second color (e.g., red) and at pixel locations corresponding to the second color filter locations on the first CFA, and the third color data set 217-$c$ may include color data for only the third color (e.g., blue) and at pixel locations corresponding to the third color filter locations on the first CFA.

A first channel interpolation 220 may be performed on the first color data set 217-$a$. The first channel interpolation 220 may include calculating a first color (e.g., green) value for the pixel locations that do not have color values. In some cases, the first channel interpolation 220 may be based on a first direction (e.g., a horizontal or a vertical direction), a second direction (e.g., a diagonal or a cross-diagonal direction), or a combination thereof. In some cases, the first direction or second direction may be weighted based on a determining whether the first direction or second direction is more dominant. The first channel interpolation 220 may output a first color component 221-$a$ of the second set of image data 221.

In some cases, a first color difference set 223-$a$ may be generated based on the first color component 221-$a$ and the second color data set 217-$b$ (e.g., a first-second color). The first color difference set 223-$a$ may be generated by combining color values from the first color component 221-$a$ with corresponding color values from the second color data set 217-$b$. A second color difference set 223-$b$ may be similarly generated from the first color component 221-$a$ and third color data set 217-$b$. In some cases, a color difference interpolation 225 may be performed on the first and second color difference sets 223-$a$, 223-$b$. For example, the color difference interpolation 225 may be based on a vertical direction or a horizontal direction determined by the direction detection process 210. The color difference interpolation may output a first color difference component 227-$a$ based on the first and second colors (e.g., green and red) and a second color difference component 227-$b$ based on the first and third colors (e.g., green and blue). Additionally or alternatively, a second color component 221-$b$ and a third color component 221-c for the second set of image data 221 may be determined based on the first color component 221-a and the second and third color difference components 227-a, 227-b.

A CFA sampling procedure 230 may be performed on the second set of image data 221 to generate the third set of image data 235. In some cases, the CFA sampling procedure 230 may include assigning a color value from the second image data set to a corresponding color location (e.g., pixel location) of the third set of image data 235 based on a CFA pattern (e.g., Bayer) associated with the third set of image data 235. For example, if the third set of image data 235 includes second CFA data 237 (e.g., output CFA color data set) based on a Bayer pattern, then locations where the Bayer pattern specifies first color values (e.g., green) the green color values from the second set of image data 221 may be assigned/defined. Similarly, the second color (e.g., red) values from the second set of image data 221 may be assigned/defined to the corresponding second color locations defined by the second CFA pattern (e.g., Bayer pattern). The third color (e.g., blue) may be assigned in a similar way. Thus, the output CFA color data set may be based on color values from the second set of image data 221.

Figure 3:
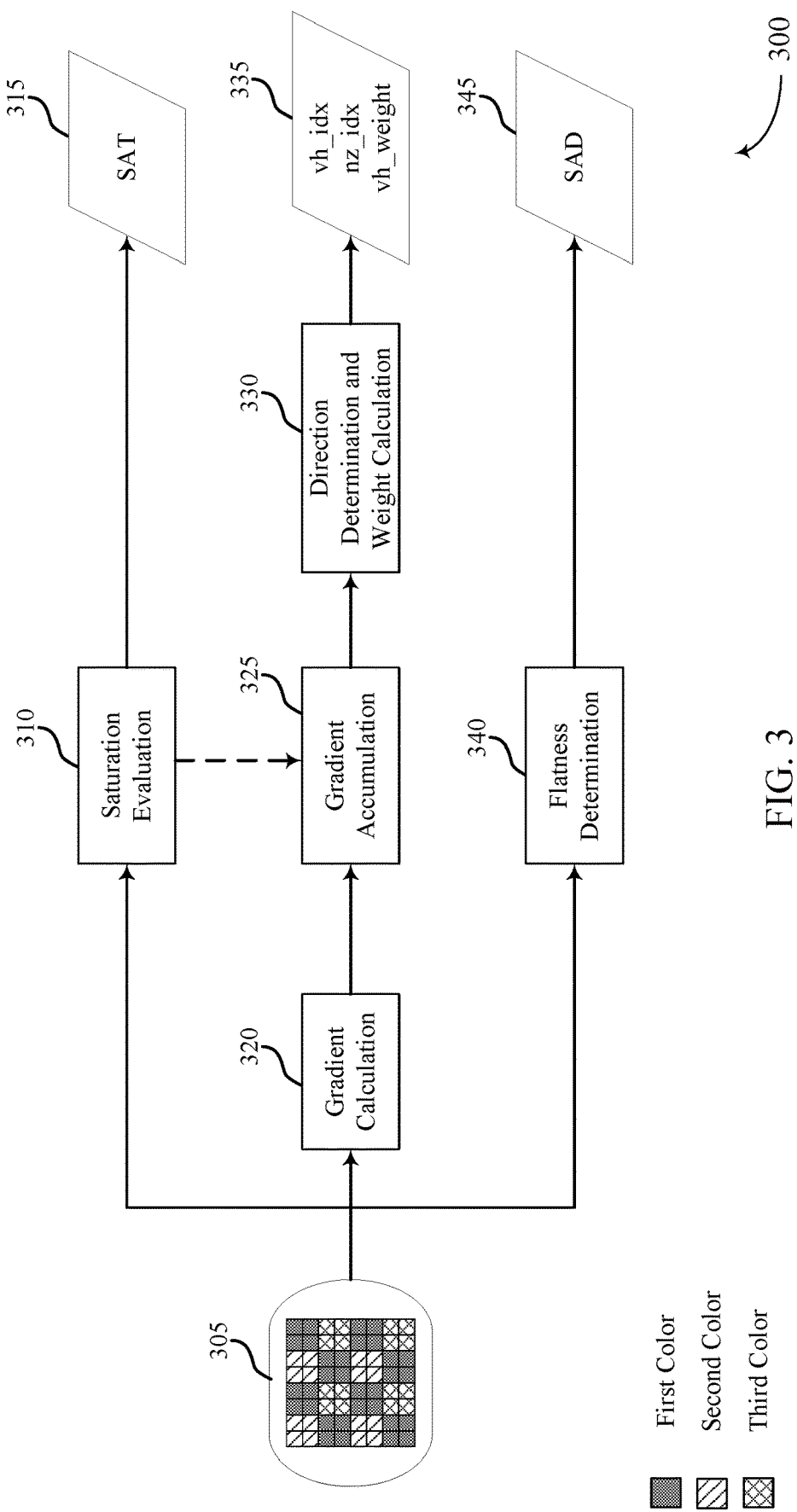

FIG. 3 illustrates an example of a process flow 300 that supports techniques for image processing in accordance with aspects of the present disclosure. In some examples, process flow 300 may implement aspects of image processing systems 100 or 200. The process flow 300 may be an example of a direction detection process such as the direction detection process 210 described with reference to FIG. 2. The process flow 300 may include a first set of image data 305 which may be an example of the first set of image data 205 described with reference to FIG. 2. The process flow 300 may include a saturation evaluation 310 that outputs a saturation parameter (e.g., SAT) 315, a gradient calculation 320, gradient accumulation 325 and direction determination and weight calculation 330 that outputs a vertical/horizontal direction index (e.g., vh_idx), diagonal/cross-diagonal direction index (e.g., nz_idx), and a weight parameter (e.g., vh_weight) 335, and a flatness determination 340 that outputs a sum of absolute difference parameter 345. The process flow 300 provides an example processes and calculations that may generate direction detection parameters used to perform the interpolation techniques (e.g., the first channel interpolation 220 and color difference interpolation 225) described with reference to FIG. 2.

The first set of image data 305 may include all the pixels/color regions for a portion of an image or an entire image. A representative region (e.g., 8×8 pixel region) is shown in FIG. 3 for clarity, however the first set of image data 305 may include pixel data for larger or smaller regions. In some cases, a kernel may be defined that divides image data (e.g., the first set of image data 305) into smaller sections. For example, a kernel could be defined as a six-by-six section of pixel values. In this regard, the process flow 300 may include performing one or more of the direction detection processes on a kernel scale. That is, the saturation evaluation 310, gradient calculation 320, flatness determination 340, or the like can be performed on a kernel by kernel basis. The kernel can be defined in a variety of ways (e.g., size, shape, etc.) and kernel by kernel calculations may be overlapping, non-overlapping, or a combination thereof.

The saturation evaluation 310 may characterize or quantify a saturation of color data (e.g., color saturation gradient) for a kernel region. In some cases, the saturation evaluation 310 may include calculating a saturation value (SAT) 315, which may be used to in the gradient calculation 320, the interpolation calculation, which is discussed further herein (e.g., with reference to FIGS. 4-6), or a combination thereof. The SAT value 315 may be calculated according to Equation 1 shown below.

$$SAT = \min\left(\max\left(\left|\frac{\bar{B}}{\bar{G}} - 1.0\right|, \left|\frac{\bar{R}}{\bar{G}} - 1.0\right|\right), 1.0\right) \quad (1)$$

In Equation 1, $\bar{G}$ is the average of the first color (e.g., green) pixel values over the kernel, $\bar{R}$ is the average of the second color (e.g., red) pixel values over the kernel, and $\bar{B}$ is the average of the third color value (e.g., blue) pixel values over the kernel. Thus, in some cases the SAT value 315 from Equation 1 may either have a value of one or less than one.

In some cases, the gradient calculation 320 and gradient accumulation 325 may include determining color gradients across different portions of a kernel. This may include calculating same-channel gradients for pixels or color regions that are of the same color. For example, color gradients may be calculated between adjacent color pixels (e.g., two green color pixels) to determine a same-channel gradient. Additionally or alternatively, cross-channel gradients for pixels or color regions that are of different colors may be calculated. For example, one or more color gradients may be calculated between adjacent color pixels that are of different colors (e.g., red and blue pixels). Further, in some cases, horizontal, vertical, diagonal and cross-diagonal gradient directions may be calculated for both same-channel gradients and cross-channel gradients. Thus, multiple different color gradients may be calculated. In some cases, the gradients may be compared to determine a gradient direction, a weight calculation or a combination thereof.

At 330, the direction detection process may also include a direction determination and weight calculation. In some cases, the direction determination may include selecting one or more directions (e.g., horizontal, vertical, diagonal or cross-diagonal) for performing the interpolation procedures discussed herein. For example, this may include selecting a first interpolation direction between a vertical direction and a horizontal direction and selecting a second interpolation direction between a diagonal direction and cross-diagonal direction. In some cases, selecting the first interpolation direction may include determining whether the vertical color gradient or the horizontal color gradient is more dominant (e.g., larger calculated color gradient). Similarly, selecting the second interpolation direction may include determining whether the diagonal color gradient or cross diagonal color gradient is more dominant. Determining whether a direction is more dominant may include comparing the gradient calculations 320 for each of the different directions, which will be discussed in greater detail in relation to FIGS. 4-6.

In some cases, a weight calculation may also be performed at 330. The weight calculation may include determining a weight value for each of the first interpolation direction and second interpolation direction used to perform an interpolation calculation. That is, the weight value may modify or change the effect that the first and second interpolation directions have on the interpolation calculations. In some cases, this includes determining whether the first interpolation direction or the second interpolation direction is more dominant (e.g., larger color gradient). For example, the more dominant direction between the first and second interpolation directions may have a greater effect on the color value calculated by the interpolation calculation.

Example procedures and algorithms for performing the weight calculation will be discussed in greater detail in relation to FIGS. 4-6.

At 340 a flatness determination may be performed. The flatness determination may be used to determine if a region (e.g., kernel) of color data (e.g., color pixels) satisfies a flatness criterion (e.g., little color change). This may be accomplished by calculating flatness value and comparing it to a threshold. For example, if the flatness value satisfies the threshold the region may be determined or classified as a flat region. In some cases, non-direction interpolation may be performed on flat regions. If the flatness value does not satisfy the threshold then the region may be determined to be a non-flat region. In some cases, a direction interpolation may be performed on non-flat regions. A sum of the absolute difference (SAD) calculation may be used to calculate a flatness value. The SAD value may be calculated according to Equation 2 shown below.

$$\text{SAD} = \max(v_{diff}, h_{diff}, n_{diff}, z_{diff}) \qquad (2)$$

In Equation 2, $v_{diff}$ may be an output of a color gradient calculation in the vertical direction, which is calculated according to Equation 4 described herein; $h_{diff}$ may be an output of a color gradient calculation performed in the horizontal direction, which is calculated according to Equation 5 described herein; $n_{diff}$ may be an output of a color gradient calculation in the diagonal direction, which is calculated according to Equation 6 described herein; and $z_{diff}$ may be an output of a color gradient calculation in the cross-diagonal direction, which is calculated according to Equation 7 described herein.

In some cases, the flatness determination at 340 may be performed by comparing the SAD value to a threshold. The threshold may be defined or tuned based on performing the interpolation procedures to generate an image output. For example, a more accurate interpolation may occur using a flatness threshold that results in non-directional interpolation (e.g., the threshold is not usually satisfied), and thus, the flatness threshold may be adjusted to achieve this result. In other cases, an interpolation may be performed faster or more efficient if more non-directional interpolations are performed, and thus, the flatness threshold may be adjusted to achieve this result. The flatness determination may be performed according to Equation 3 shown below.

$$\text{If SAD} < \text{SAD}_{th}\text{: then pixels in flat region} \qquad (3)$$

In Equation 3, $\text{SAD}_{th}$ may be the flatness threshold, which may be defined or tuned as described herein.

Figure 4:
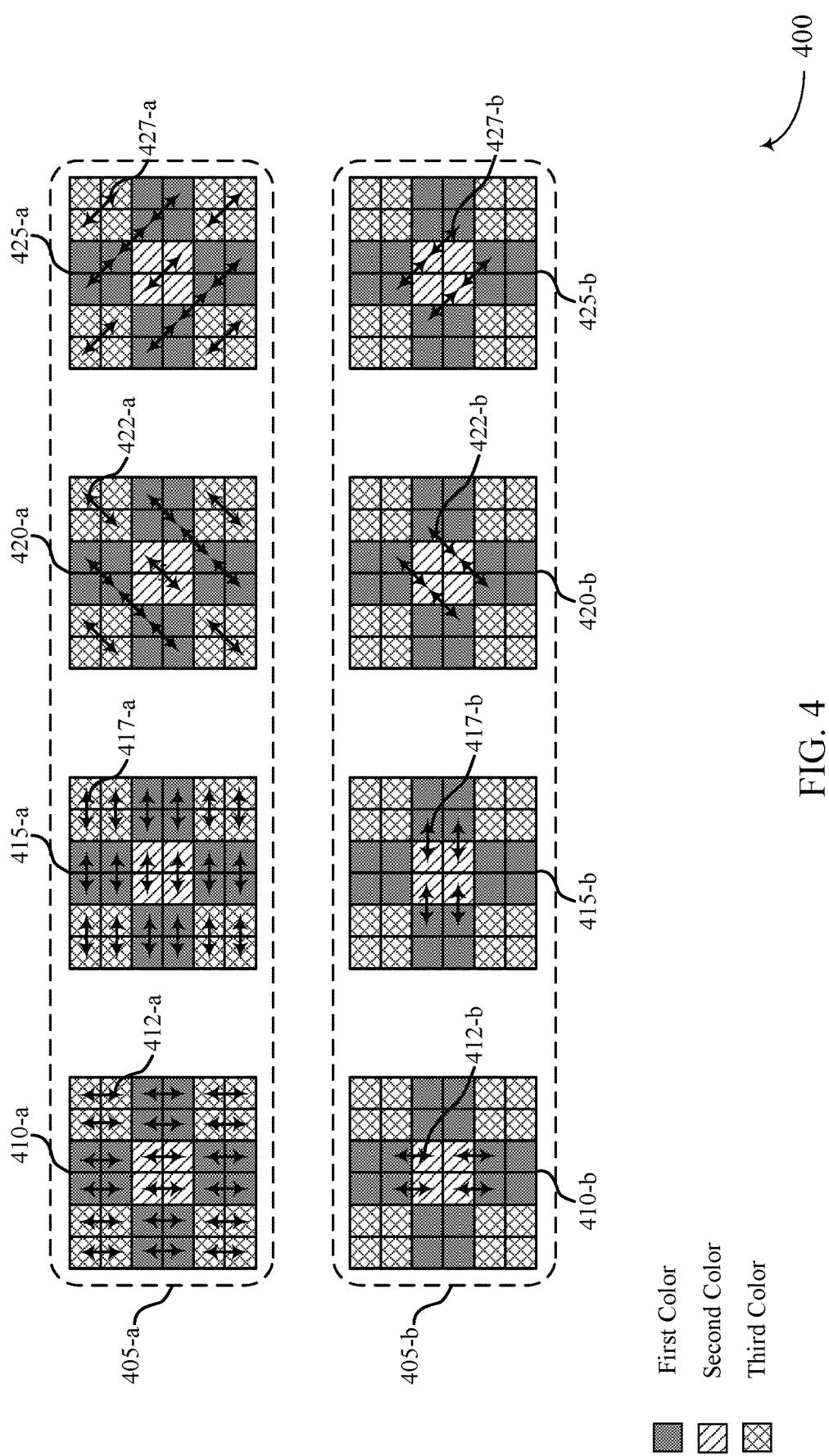

FIG. 4 illustrates an example of a direction detection procedure 400 that supports techniques for image processing in accordance with aspects of the present disclosure. In some examples, the direction detection procedure 400 may implement aspects of image processing system 100. The direction detection procedure 400 may include a gradient calculation, gradient accumulation, direction determination, weight calculation or combination thereof which may be examples of the gradient calculation 320, gradient accumulation 325 or direction determination and weight calculation 330 discussed with reference to FIG. 3. The direction detection procedure 400 may include calculating same-channel color gradients 405-$a$ (e.g., color gradients across regions/pixels of the same color), cross-channel color gradients 405-$b$ (e.g., color gradients across regions/pixels of different colors), or a combination thereof. In some cases, the direction detection procedure 400 may also include calculating one or more vertical color gradients 410, horizontal color gradients 415, diagonal color gradients 420, cross-diagonal color gradients 425, or a combination thereof.

In some cases, a gradient calculation may include calculating a color gradient for each of a vertical color gradient 410, a horizontal color gradient 415, a diagonal color gradient 420, or a cross-diagonal color gradient 425. For example, a vertical color gradient may be calculated using both same-channel color gradients 405-$a$ and cross-channel color gradients 405-$b$. The same-channel color gradient 405-$a$ may include calculating one or more vertical gradient components 412 across neighboring regions or pixels of the same color. For example, vertical gradient component 412-$a$ illustrates a same-channel color gradient 405-$a$ including adjacent pixels of a six-by-six kernel. The cross-channel color gradient 405-$b$ may include calculating one of more vertical gradient components 412 across neighboring regions or pixels of different colors. For example, vertical gradient component 412-$b$ illustrates a cross-channel color gradient 405-$b$ including adjacent pixels of a six-by-six kernel. The vertical color gradient 410 for the kernel window may be calculated over an entire kernel window according to Equation 4 shown below.

$$v_{diff} = \sum |\nabla vs_i| \times \frac{vc_{cnt}}{vs_{cnt}} \times SAT + \sum |\nabla vc_i| \times (1.0 - SAT) \qquad (4)$$

In Equation 4, $|\nabla vs_i|$ may be the absolute value of the same-channel vertical gradient component 412-$a$, i (e.g., where i is a number representing each of the different vertical gradient components 412), which is calculated based on the difference in color values between a first region/pixel and the adjacent second region/pixel of the same color; $vc_{cnt}$ may be a number of cross-channel vertical gradient components 412-$b$, $vs_{cnt}$ may be a number of same-channel vertical gradient components 412-$a$, and $vc_{cnt}/vs_{cnt}$ may be a ratio of the number of cross-channel vertical gradient components 412-$b$ to same-channel vertical gradient components 412-$a$; SAT may be an example of the SAT value 315 calculated according to Equation 1 shown herein; and $|\nabla vc_i|$ may be the absolute value of the cross-channel vertical gradient component 412-$b$, i (e.g., where i is a number representing each of the different vertical gradient components 412), which is calculated based on the difference in color values between a first region/pixel and the adjacent second region/pixel of different colors. Accordingly, $v_{diff}$ may represent the vertical color gradient 410 over the kernel window.

The horizontal color gradient 415 may be calculated similar to the vertical color gradient. For example, the horizontal color gradient 415 for the kernel window may be calculated over an entire kernel window according to Equation 5 shown below.

$$h_{diff} = \sum |\nabla hs_i| \times \frac{hc_{cnt}}{hs_{cnt}} \times sat + \sum |\nabla hc_i| \times (1.0 - sat) \qquad (5)$$

In Equation 5, $|\nabla hs_i|$ may be the absolute value of the same-channel horizontal gradient component 417-$a$, i (e.g., where i is a number representing each of the different horizontal gradient components 417), which is calculated based on the difference in color values between a first region/pixel and the adjacent second region/pixel of the same color; $hc_{cnt}$ may be a number of cross-channel horizontal gradient components 417-$b$, $hs_{cnt}$ may be a number of same-channel horizontal gradient components 417-$a$, and $hc_{cnt}/hs_{cnt}$ may be a ratio of the number of cross-channel horizontal gradient components 417-$b$ to same-channel horizontal gradient components 417-$a$; SAT may be an example of the SAT value 315 calculated according to Equation 1 shown herein; and $|\nabla hc_i|$ may be the absolute value of the cross-channel horizontal gradient component 417-$b$, i (e.g., where i is a number representing each of the different horizontal gradient components 417), which is calculated based on the difference in color values between a first region/pixel and the adjacent second region/pixel of different colors. Accordingly, $h_{diff}$ may represent the horizontal color gradient 415 over the kernel window.

The diagonal color gradient 420 may be calculated similar to the vertical or horizontal color gradients. For example, the diagonal color gradient 420 for the kernel window may be calculated over an entire kernel window according to Equation 6 shown below.

$$n_{diff} = \sum |\nabla ns_i| \times \frac{nc_{cnt}}{ns_{cnt}} \times sat + \sum |\nabla nc_i| \times (1.0 - sat) \quad (6)$$

In Equation 6, $|\nabla ns_i|$ may be the absolute value of the same-channel diagonal gradient component 422-$a$, i (e.g., where i is a number representing each of the different diagonal gradient components 422), which is calculated based on the difference in color values between a first region/pixel and the adjacent second region/pixel of the same color; $nc_{cnt}$ may be a number of cross-channel diagonal gradient components 422-$b$, $ns_{cnt}$ may be a number of same-channel diagonal gradient components 422-$a$, and $nc_{cnt}/ns_{cnt}$ may be a ratio of the number of cross-channel diagonal gradient components 422-$b$ to same-channel diagonal gradient components 422-$a$; SAT may be an example of the SAT value 315 calculated according to Equation 1 shown herein; and $|\nabla nc_i|$ may be the absolute value of the cross-channel diagonal gradient component 422-$b$, i (e.g., where i is a number representing each of the different diagonal gradient components 422), which is calculated based on the difference in color values between a first region/pixel and the adjacent second region/pixel of different colors. Accordingly, $n_{diff}$ may represent the diagonal color gradient 420 over the kernel window.

The cross-diagonal color gradient 425 may be calculated similar to the vertical, horizontal, or diagonal color gradients. For example, the cross-diagonal color gradient 425 for the kernel window may be calculated over an entire kernel window according to Equation 7 shown below.

$$z_{diff} = \sum |\nabla zs_i| \times \frac{zc_{cnt}}{zs_{cnt}} \times sat + \sum |\nabla zc_i| \times (1.0 - sat) \quad (7)$$

In Equation 7, $|\nabla zs_i|$ may be the absolute value of the same-channel cross-diagonal gradient component 427-$a$, i (e.g., where i is a number representing each of the different cross-diagonal gradient components 427), which is calculated based on the difference in color values between a first region/pixel and the adjacent second region/pixel of the same color; $zc_{cnt}$ may be a number of cross-channel cross-diagonal gradient components 427-$b$, $zs_{cnt}$ may be a number of same-channel cross-diagonal gradient components 427-$a$, and $zc_{cnt}/zs_{cnt}$ may be a ratio of the number of cross-channel cross-diagonal gradient components 427-$b$ to same-channel cross-diagonal gradient components 427-$a$; SAT may be an example of the SAT value 315 calculated according to Equation 1 shown herein; and $|\nabla zc_i|$ may be the absolute value of the cross-channel cross-diagonal gradient component 427-$b$, i (e.g., where i is a number representing each of the different cross-diagonal gradient components 427), which is calculated based on the difference in color values between a first region/pixel and the adjacent second region/pixel of different colors. Accordingly, $z_{diff}$ may represent the cross-diagonal color gradient 425 over the kernel window.

In some cases, the direction determination and weight calculation may be based on the gradient calculations. For example, an interpolation may be performed for a first color of a CFA according to one or more directions. In this regard, for the first color (e.g., green) a first interpolation direction may be selected from either a vertical direction ($G_v$) or a horizontal direction ($G_h$). The first interpolation direction may be selected based on the vertical/horizontal direction index (e.g., $vh_{idx}$). In some cases, first interpolation direction may be selected based on the more dominant color gradient direction over the kernel window. For example, the first interpolation direction may be selected according to Equation 8 shown below.

If: $v_{diff} < h_{diff}$ then $vh_{idx} = G_h$ \quad (8)

Else: $vh_{idx} = G_v$

In Equation 8, $v_{diff}$ may represent the vertical color gradient 410 over the kernel window, $h_{diff}$ may represent the horizontal color gradient 415 over the kernel window, and $vh_{idx}$ may be the vertical horizontal direction index. If $h_{idx} = G_h$ then the first interpolation direction may be based on a horizontal direction. If $vh_{idx} = G_v$ then first interpolation direction may be based on a vertical direction.

Additionally or alternatively, an interpolation for the first color (e.g., green) may also be based on a second interpolation direction. In some cases, the second interpolation direction may be selected from either a diagonal direction ($G_n$) or a cross-diagonal direction ($G_z$). The second interpolation direction may be selected based on the diagonal/cross-diagonal direction index (e.g., $nz_{idx}$). In some cases, the second interpolation direction may be selected based on the more dominant color gradient direction over the kernel window. For example, the second interpolation direction may be selected according to Equation 9 shown below.

If: $n_{diff} < z_{diff}$ then $nz_{idx} = G_z$

Else: $nz_{idx} = G_n$ \quad (9)

In Equation 9, $n_{diff}$ may represent the diagonal color gradient 420 over the kernel window, $z_{diff}$ may represent the cross-diagonal color gradient 425 over the kernel window, and $nz_{idx}$ may be the vertical horizontal direction index. If $nz_{idx} = G_n$ then the second interpolation direction may be based on a cross diagonal direction. If $nz_{idx} = G_n$ then the second interpolation direction may be based on a diagonal direction.

In some cases, the interpolation procedure may also include a weight parameter (e.g., $vh_{weight}$). The weight parameter may be determined based on a comparison of the first interpolation direction to the second interpolation direction. For example, if the first interpolation direction color gradient is determined to be more dominant than the second interpolation direction color gradient and a threshold is met then weight parameter may be set to a first value to increase effect of the first interpolation direction on the outputted interpolation value for the first color (e.g., green). Similarly, if the second interpolation direction color gradient is determined to be more dominant than the first interpolation direction color gradient then and a threshold is met then the weight parameter may be set to a second value to increase the effect of the second interpolation direction on the outputted interpolation value for the first color. For example, the weight parameter may be determined according to Equation 10 shown below.

$$\text{If: } vh_{str} > 2 \times nz_{str} \text{ \& } vh_{diff-min} < nz_{diff-min} \quad (10)$$
$$\text{then } vh_{weight} = 1$$
$$\text{Else if: } nz_{str} > 2 \times vh_{str} \text{ \& } vh_{diff-min} > nz_{diff-min}$$
$$\text{then } vh_{weight} = 0$$
$$\text{Else: } vh_{weight} = \frac{nz_{diff-min}}{(nz_{diff-min} + vh_{diff-min})}$$

The variables for Equation 10 may be determined according to Equations 11-14 shown below.

$$vh_{str} = \frac{\max(v_{diff}, h_{diff})}{\min(v_{diff}, h_{diff})} \quad (11)$$

$$nz_{str} = \frac{\max(n_{diff}, z_{diff})}{\min(n_{diff}, z_{diff})} \quad (12)$$

$$vh_{diffmin} = \min(v_{diff}, h_{diff}) \quad (13)$$

$$nz_{diff-min} = \min(n_{diff}, z_{diff}) \quad (14)$$

In Equations 11-14, $\max(v_{diff}, h_{diff})$ may be the larger of the calculated values between the $v_{diff}$ and $h_{diff}$ for the kernel and $\min(v_{diff}, h_{diff})$ may the smaller of the calculated values $v_{diff}$ and $h_{diff}$ for the kernel. Similarly, $\max(n_{diff}, z_{diff})$ may be the larger of the calculated values between the $n_{diff}$ and $z_{diff}$ for the kernel and $\min(n_{diff}, z_{diff})$ may the smaller of the calculated values $n_{diff}$ and $z_{diff}$ for the kernel.

Figure 5:
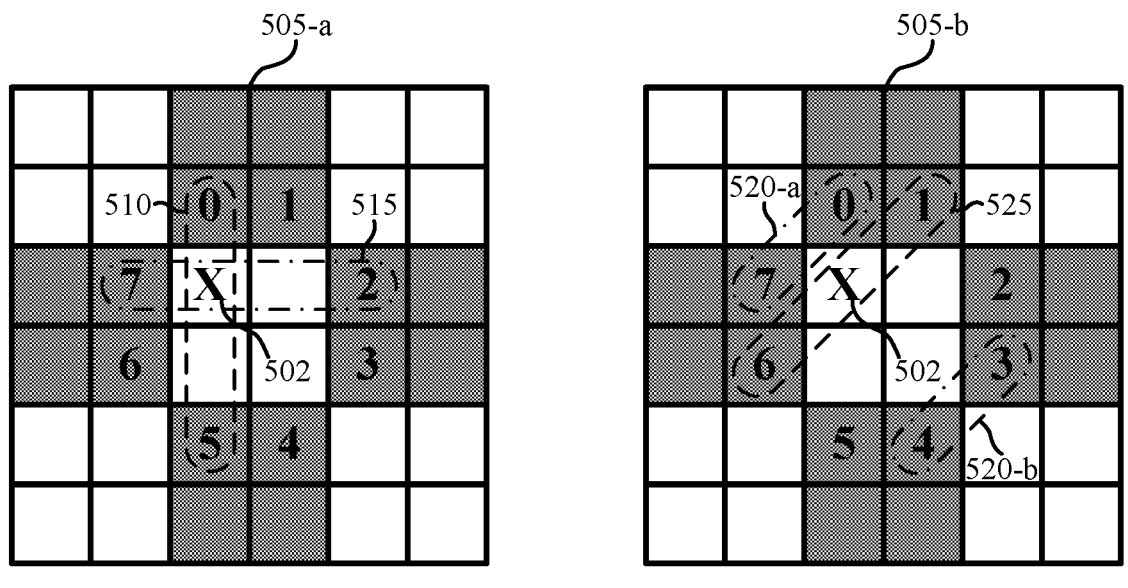

FIG. 5 illustrates an example of an interpolation procedure 500 that supports techniques for image processing in accordance with aspects of the present disclosure. In some examples, the interpolation procedure 500 may implement aspects of image processing system 100. The interpolation procedure 500 may include or be based on techniques, methods and processes such as image processing system 200, described with reference to FIG. 2; process flow 300, described with reference to FIG. 3; or direction detection procedures 400, described with reference to FIG. 4. The interpolation procedure 500 may include a direction interpolation, for example, performed based on a flatness determination as described herein. In some cases, the interpolation may be performed for a first color. However, in some examples, the interpolation procedure described herein may be performed for different colors either individually or in combination.

The interpolation procedure may include calculating a color value of a first region 502 (e.g., pixel) according to a first interpolation procedure 505-a (e.g., vertical or horizontal). In some cases, the calculating a color value of the first region 502 may further be based on a second interpolation procedure 505-b (diagonal or cross-diagonal). For example, the color value of the first region 502 may be calculated according to Equation 15 shown below.

$$G_{out} = G_{vh} \times vh_{weight} + G_{nz} \times (1 - vh_{weight}) \quad (15)$$

In Equation 15, $G_{out}$ may be the calculated color value for the first color (e.g., green color value) for the first region 502; $G_{vh}$ may be a color value calculated according to the first interpolation procedure 505-a; $G_{nz}$ may be a color value calculated according to a second interpolation procedure 505-b; and $vh_{weight}$ may be calculated according to the weight parameter discussed with regards to FIG. 4.

In some cases, the first interpolation procedure 505-a may include calculating the color value $G_{vh}$ based the first interpolation direction determined from the vertical/horizontal direction index ($vh_{idx}$). For example, as discussed herein, if $vh_{idx}=G_h$ then the first interpolation direction may be based on a horizontal direction 515. If $vh_{idx}=G_v$ then first interpolation direction may be based on a vertical direction 510.

Additionally or alternatively, the second interpolation procedure 505-b may include calculating the color value $G_{nz}$ based on the second interpolation direction determined from the diagonal/cross-diagonal direction index ($nz_{idx}$). For example, as discussed herein, if $nz_{idx}=G_z$ then the second interpolation direction may be based on a cross-diagonal direction 525. If $nz_{idx}=G_n$ then second interpolation direction may be based on a diagonal direction 520.

In some cases, calculating $G_{vh}$ and $G_{nz}$ may be performed according to the following procedures illustrated in Algorithms 16-17 and shown below.

$$G_{vh} = \text{rmsc\_interp}(vh_{idx}) \quad (16)$$

$$G_{nz} = \text{rmsc\_interp}(nz_{idx}) \quad (17)$$

In algorithms 16 and 17, $vh_{idx}$ may be inputs $G_v$ or $G_h$, and $nz_{idx}$ may be inputs of $G_n$ or $G_z$ which may be selected based on the direction detection described herein. In some cases, then inputs may be used to determine which regions or pixels will be used to calculate the color value of the first region 502. For example, if $vh_{idx}=G_v$ then the first interpolation procedure 505-a may use a vertical direction 510. In the case of the interpolation procedure being performed on green regions/pixels this may include using green color values from the 0 and 5 regions shown in FIG. 5, which may be referred to as G0 and G5. If $vh_{idx}=G_h$ then the first interpolation procedure 505-a may use a horizontal direction 515. In the case of the interpolation procedure being performed on green regions/pixels this may include using green color values from the 2 and 7 regions shown in FIG. 5, which may be referred to as G2 and G7.

Additionally or alternatively, if $nz_{idx}=G_n$ then the second interpolation procedure 505-b may use a diagonal direction 520. In the case of the interpolation procedure being performed on green regions/pixels this may include using green color values from the 0, 3, 4 and 7 regions shown in FIG. 5, which may be referred to as G0, G3, G4 and G7. If $nz_{idx}=G_z$ then the second interpolation procedure 505-b may use a cross-diagonal direction 525. In the case of the interpolation procedure being performed on green regions/pixels this may include using green color values from the 1 and 6 regions shown in FIG. 5, which may be referred to as G1 and G6. In some cases, the first interpolation procedure 505-a and second interpolation procedure may be performed according to the procedure illustrated in Algorithm 18 shown below.

$$\text{rmsc\_interp}(dir) \quad (18)$$
$$\{$$
$$\text{If: } dir = G_v$$

-continued return rmsc_weighted_average(G0, G5, X, SAT)

If: dir = $G_h$ return rmsc_weighted_average(G7, G2, X, SAT)

If: dir = $G_z$ return rmsc_weighted_average(G1, G6, X, SAT)

If: dir = $G_n$ return rmsc_weighted_average $$\left(\frac{G0+G7}{2}, \frac{G3+G4}{2}, X, SAT\right)$$

}

In algorithm 18, the dir may be an input variable, where dir may be $vh_{idx}$ (e.g., $G_v$ or $G_h$) or $nz_{idx}$ ($G_n$ or $G_z$). Algorithm 18 may call the function "return rmsc_weighted_average," which may have variables (G0, G5, X, SAT), which are based on the input variable dir. For example, if dir=$G_v$ then the first interpolation procedure 505-a may be calculated by return rmsc_weighted_average(G0, G5, X, SAT), where G0 is the color value from the green pixel region 0, G5 is the color value from the green pixel region G5, X is the color value of the first region 502 and SAT may be the SAT value 315 calculated according to Equation 1. The returned value of return rmsc_weighted_average may be calculated according to Algorithm 19 shown below.

rmsc_weighted_average(P1, P2, X, offset)     (19)

{ tmp1 = |P1 − X| + offset tmp2 = |P2 − X| + offset $$output = \frac{(P1 \times tmp2 + p2 \times tmp1)}{(tmp2 + tmp1)}$$

}

For example, in the case of dir=$G_v$, return rmsc_weighted_average may return a first green color value $G_{vh}$, for example, according to Algorithm 19, where $G_{vh}$ may be the first color value used to calculate $G_{out}$ for the first region 502. In some cases, a second interpolation procedure may also be performed to calculate the first color value $G_{out}$. In this case, dir=$G_n$ may also be inputted into Algorithm 18 and return rmsc_weighted_average may return a second green color value $G_{nz}$ for example, according to Algorithm 19, where $G_{nz}$ may be the second color value used to calculate $G_{out}$ for the first region 502.

In some cases, color valued for additional regions/pixels may be calculated according to the techniques described herein. In some cases, this may include using different combinations of procedures, regions/pixel values or the like. In this regard, the above techniques are provided to illustrate the general concepts that can be applied to other situations (e.g., regions, pixel locations, etc.).

FIG. 6 illustrates an example of a second interpolation procedure 600 that supports techniques for image processing in accordance with aspects of the present disclosure. In some examples, the second interpolation procedure 600 may implement aspects of image processing system 100. The second interpolation procedure 600 may include or be based on techniques, methods and processes such as image processing system 200, described with reference to FIG. 2; process flow 300, described with reference to FIG. 3; direction detection procedures 400, described with reference to FIG. 4; or the interpolation procedure 500 described with reference to FIG. 5. The second interpolation procedure 600 may performed on a subset of colors of a CFA pattern. That is in some cases the interpolation procedure 500 may be performed on a first color (e.g., green) of a CFA array, and the second interpolation procedure may be performed to determine or estimate color values for the second (e.g., red) and third (e.g., green) colors of the CFA pattern.

In some cases, the second interpolation procedure 600 may be used to estimate or determine color values (e.g., second or third color values) for regions/pixels that do not have the second or third color values associated with them. For example, a QCFA array may have a pattern including first (e.g., green), second (e.g., red) and third (e.g., blue) colors. In this regard, the first set of image data may only have second color values for a subset of all the regions of the QFCA pattern. Accordingly, second color values can be estimated for the other regions using the second interpolation procedure. Additionally or alternatively, estimating the color values using the second interpolation procedure 600 may include a direction detection procedure to select between a vertical interpolation direction or a horizontal interpolation direction as described herein.

In some examples, the second interpolation procedure 600 may use different groups of color regions/pixels for determining a second color value based on the CFA pattern. For example, a first kernel region 605-a may include estimating the third color value (e.g., blue) for a second color region (e.g., red), which is marked with an X in FIG. 6. In a first example, at location 610, the color value for the third color may be estimated for a first location X, based on either a vertical interpolation method or horizontal interpolation method described herein. For example, if the vertical interpolation method is determined to be more dominant then the third color value for X at location 610 may be estimated using the third color values from the 8 and 11 regions shown in FIG. 6. If the horizontal method is determined to be more dominant, then the third color value for X at location 610 may be estimated using the color values from the 8 and 9 regions. In some cases, estimating or calculating the color value may be done by averaging the selected regions. In other cases, the color value may be calculated using the techniques and algorithms discussed herein, for example, the algorithms discussed in relation to FIG. 5.

The color values for X at locations 615, 620 and 625 may be calculated in a similar manner to location 610. For example, at location 615, the color value for X may be calculated for the vertical direction using regions 9 and 10 or calculated for the horizontal direction using regions 8 and 9. At location 620, the color value for X may be calculated for the vertical direction using regions 9 and 10, or calculated for the horizontal direction using regions 10 and 11. At, location 625, the color value for X may be calculated for the vertical direction using regions 8 and 11, or calculated for the horizontal direction using regions 10 and 11.

In some cases, a second kernel region 605-b may include estimating the third color value (e.g., blue) for a first color region (e.g., green), which is marked with an X in FIG. 6. In a first example, at location 630, the color value for the third color may be estimated for a first location X, based on either a vertical interpolation method or horizontal interpolation method described herein. For example, if the vertical interpolation method is determined to be more dominant then the third color value for X at location 630 may be estimated using the third color values from the 0 and 5 regions shown in FIG. 6. If the horizontal method is determined to be more dominant, then the third color value for X at location 630 may be estimated using the color values from the 0 and 1 regions.

The color values for X at locations 635, 640 and 645 may be calculated in a similar manner to location 630. For example, at location 635, the color value for X may be calculated for the vertical direction using regions 1 and 4, or calculated for the horizontal direction using regions 0 and 1. At location 640, the color value for X may be calculated for the vertical direction using regions 1 and 4, or calculated for the horizontal direction using regions 4 and 5. At, location 645, the color value for X may be calculated for the vertical direction using regions 0 and 5, or calculated for the horizontal direction using regions 4 and 5.

Figure 7:
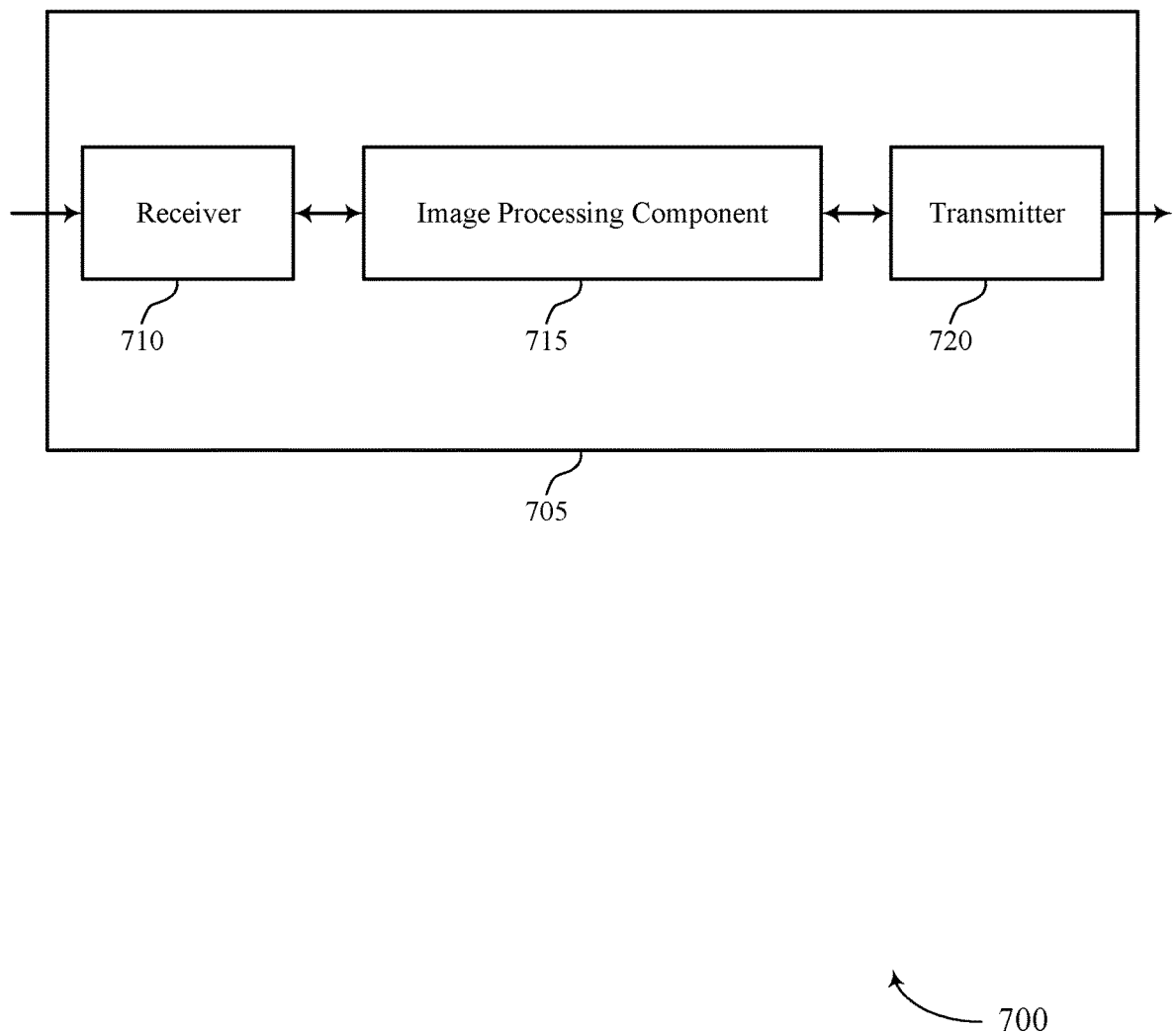
FIGS. 7 and 8 show block diagrams of devices that support techniques for image processing in accordance with aspects of the present disclosure.

FIG. 7 shows a block diagram 700 of a device 705 that supports techniques for image processing in accordance with aspects of the present disclosure. The device 705 may be an example of aspects of an ISP 115 as described herein. The device 705 may include a receiver 710, an image processing component 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for image processing, etc.). Information may be passed on to other components of the device 705. The receiver 710 may be an example of aspects of the transceiver 1020 described with reference to FIG. 10. The receiver 710 may utilize a single antenna or a set of antennas.

The image processing component 715 may receive a first set of image data collected at an image sensor based on a first color filter array (CFA) associated with the image sensor, the first CFA including a first filter pattern, calculate a color saturation gradient based on the first set of image data, calculate multiple color gradients based on the color saturation gradient, the multiple color gradients each associated with a region of the first set of image data, where each color gradient characterizes a color variation along a different direction of the region, generate a second set of image data including a color value for the region based on comparing a first direction gradient of the multiple color gradients with a second direction gradient of the multiple color gradients, and map the color value associated with the region to a third set of image data associated with a second CFA. The image processing component 715 may be an example of aspects of the image processing component 1010 described herein.

The image processing component 715, or its sub-components, may be implemented in hardware, code (e.g., software or firmware) executed by a processor, or any combination thereof. If implemented in code executed by a processor, the functions of the image processing component 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. The image processing component 715, or its sub-components, may be physically located at various positions, including being distributed such that portions of functions are implemented at different physical locations by one or more physical components. In some examples, the image processing component 715, or its sub-components, may be a separate and distinct component in accordance with various aspects of the present disclosure. In some examples, the image processing component 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
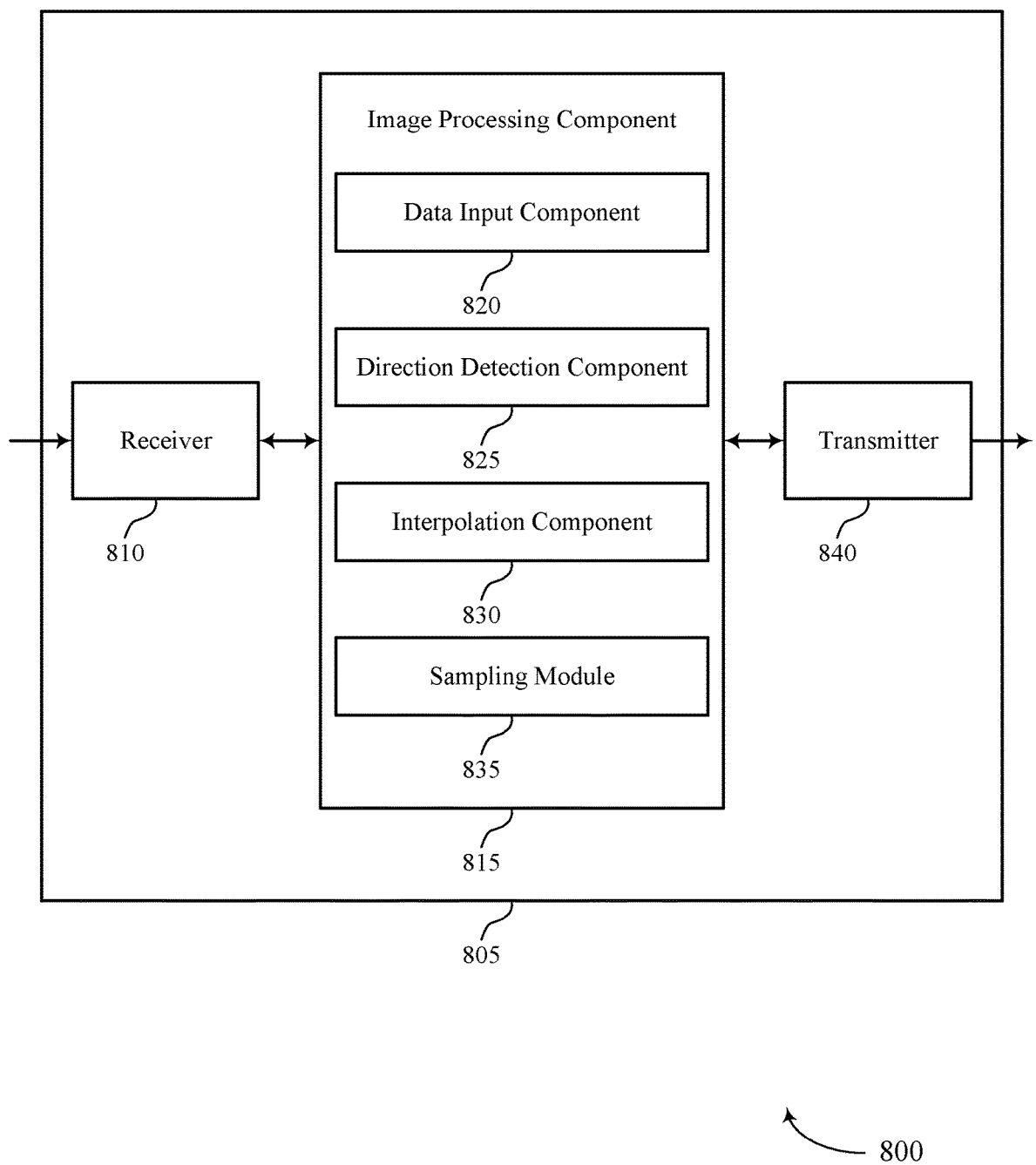

FIG. 8 shows a block diagram 800 of a device 805 that supports techniques for image processing in accordance with aspects of the present disclosure. The device 805 may be an example of aspects of a device 705, or an ISP 115 as described herein. The device 805 may include a receiver 810, an image processing component 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to techniques for image processing, etc.). Information may be passed on to other components of the device 805. The receiver 810 may be an example of aspects of the transceiver 1020 described with reference to FIG. 10. The receiver 810 may utilize a single antenna or a set of antennas.

The image processing component 815 may be an example of aspects of the image processing component 715 as described herein. The image processing component 815 may include a data input component 820, a direction detection component 825, an interpolation component 830, and a sampling module 835. The image processing component 815 may be an example of aspects of the image processing component 1010 described herein.

The data input component 820 may receive a first set of image data collected at an image sensor based on a first color filter array (CFA) associated with the image sensor, the first CFA including a first filter pattern.

The direction detection component 825 may calculate a color saturation gradient based on the first set of image data and calculate multiple color gradients based on the color saturation gradient, the multiple color gradients each associated with a region of the first set of image data, where each color gradient characterizes a color variation along a different direction of the region.

The interpolation component 830 may generate a second set of image data including a color value for the region based on comparing a first direction gradient of the multiple color gradients with a second direction gradient of the multiple color gradients.

The sampling module 835 may map the color value associated with the region to a third set of image data associated with a second CFA.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
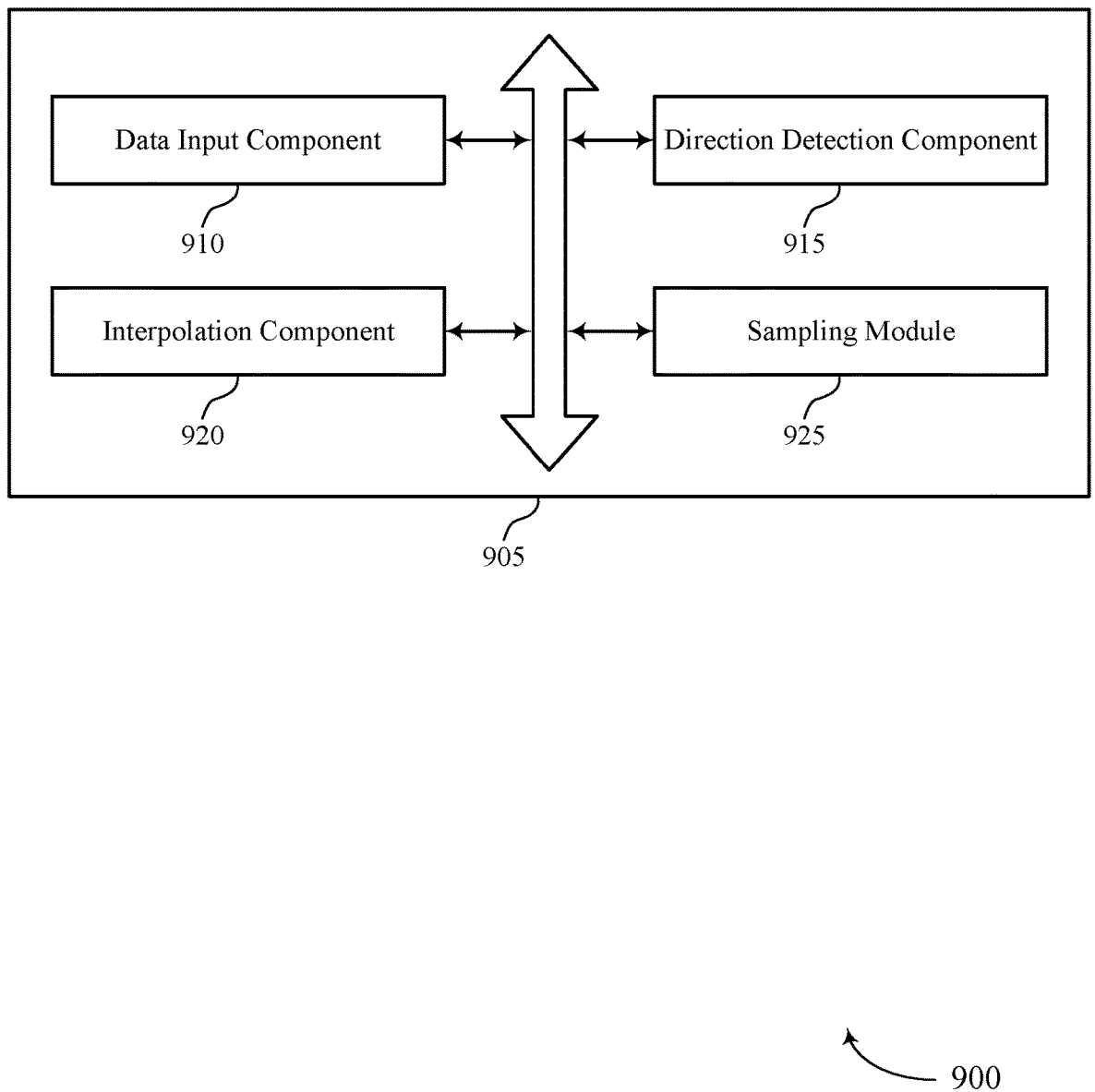
FIG. 9 shows a block diagram of an image processing component that supports techniques for image processing in accordance with aspects of the present disclosure.

FIG. 9 shows a block diagram 900 of an image processing component 905 that supports techniques for image processing in accordance with aspects of the present disclosure. The image processing component 905 may be an example of aspects of an image processing component 715, an image processing component 815, or an image processing component 1010 described herein. The image processing component 905 may include a data input component 910, a direction detection component 915, an interpolation component 920, and a sampling module 925. Each of these modules may communicate, directly or indirectly, with one another (e.g., via one or more buses).

The data input component 910 may receive a first set of image data collected at an image sensor based on a first color filter array (CFA) associated with the image sensor, the first CFA including a first filter pattern.

The direction detection component 915 may calculate a color saturation gradient based on the first set of image data. In some examples, the direction detection component 915 may calculate multiple color gradients based on the color saturation gradient, the multiple color gradients each associated with a region of the first set of image data, where each color gradient characterizes a color variation along a different direction of the region. In some examples, the direction detection component 915 may determine an average color value within a kernel for a first color, a second color, a third color or a combination thereof. In some examples, the direction detection component 915 may determine a first interpolation direction based on calculating a first color gradient along a first direction and a second color gradient along a second direction. In some examples, the direction detection component 915 may determine a second interpolation direction based on calculating a third color gradient along a third direction and a fourth color gradient along a fourth direction. In some examples, the direction detection component 915 may calculate a direction weight based on the first color gradient, the second color gradient, the third color gradient, the fourth color gradient, or a combination thereof. In some examples, the direction detection component 915 may calculate a flatness value associated with the region based on comparing the first color gradient, the second color gradient, the third color gradient, the fourth color gradient, or a combination thereof. In some examples, the direction detection component 915 may define whether the region is in a flat area based on comparing the flatness value to a flatness threshold.

The interpolation component 920 may generate a second set of image data including a color value for the region based on comparing a first direction gradient of the multiple color gradients with a second direction gradient of the multiple color gradients. In some examples, the interpolation component 920 may calculate the color value for a first color associated with the region based on a first set of color values along the first interpolation direction, a second set of color values along the second interpolation direction and the direction weight. In some examples, the interpolation component 920 may calculate a second color value for a second color associated with the region based on a third set of color values along the first interpolation direction. In some examples, the interpolation component 920 may generate the color value for the region based on determining the region is in a flat area. In some examples, the interpolation component 920 may perform a non-directional interpolation for the region based on determining that the flatness value is less than the flatness threshold. In some examples, non-directional interpolation includes averaging values of pixels for a first color within a kernel.

The sampling module 925 may map the color value associated with the region to a third set of image data associated with a second CFA. In some examples, mapping the color value associated with the region to the third set of image data further includes interpolating a first color value, a second color value, a third color value, or a combination thereof associated with the region to the third set of image data based on the filter color of the Bayer pattern. In some examples, outputting the third set of image data as a Bayer pattern CFA, where each region of the third set of image data includes a color value corresponding to a color specified for that region by the Bayer pattern CFA. In some cases, the mapping is based on a filter color of the second CFA associated with the region. In some cases, the second CFA is a Bayer pattern.

Figure 10:
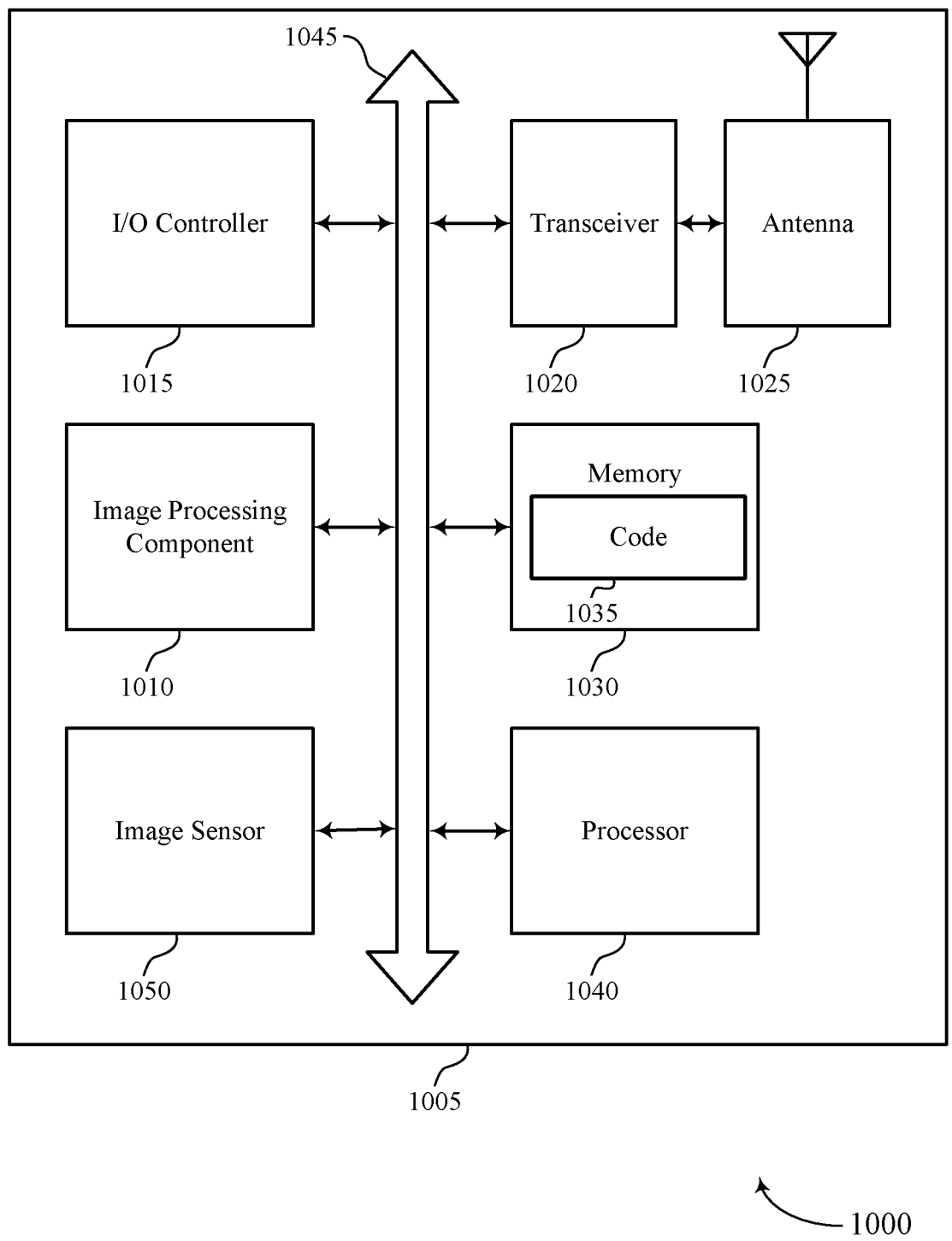
FIG. 10 shows a diagram of a system including a device that supports techniques for image processing in accordance with aspects of the present disclosure.

FIG. 10 shows a diagram of a system 1000 including a device 1005 that supports techniques for image processing in accordance with aspects of the present disclosure. The device 1005 may be an example of or include the components of device 705, device 805, or a ISP 115 as described herein. The device 1005 may include components for bi-directional voice and data communications including components for transmitting and receiving communications, including an image processing component 1010, an I/O controller 1015, a transceiver 1020, an antenna 1025, memory 1030, a processor 1040, and an image sensor 1050. These components may be in electronic communication via one or more buses (e.g., bus 1045).

The image processing component 1010 may receive a first set of image data collected at an image sensor based on a first color filter array (CFA) associated with the image sensor, the first CFA including a first filter pattern, calculate a color saturation gradient based on the first set of image data, calculate multiple color gradients based on the color saturation gradient, the multiple color gradients each associated with a region of the first set of image data, where each color gradient characterizes a color variation along a different direction of the region, generate a second set of image data including a color value for the region based on comparing a first direction gradient of the multiple color gradients with a second direction gradient of the multiple color gradients, and map the color value associated with the region to a third set of image data associated with a second CFA.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for image processing).

The image sensor 1050 may include a hardware device (e.g., charge-coupled devices (CCD), complementary metal-oxide-semiconductor (CMOS) or N-type complementary metal-oxide-semiconductor (NMOS), vacuum tube, digital sensors such as flat panel detectors, quanta image sensor (QIS), active-pixel sensor (APS), or the like, or a combination thereof). In some cases, the image sensor 1050 may be configured to detect and convey information used to make an image (e.g., electromagnetic spectrum information such as visible light). In some, cases, the image sensor 1050 may convert stimulation from electromagnetic radiation into electrical signals to create image data. The image sensor 1050 may be further configured to transmit or communicate electrical signals or image data to image processing component 1010 to perform various functions (e.g., functions or tasks supporting techniques for image processing).

The code 1035 may include instructions to implement aspects of the present disclosure, including instructions to support processing color information. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
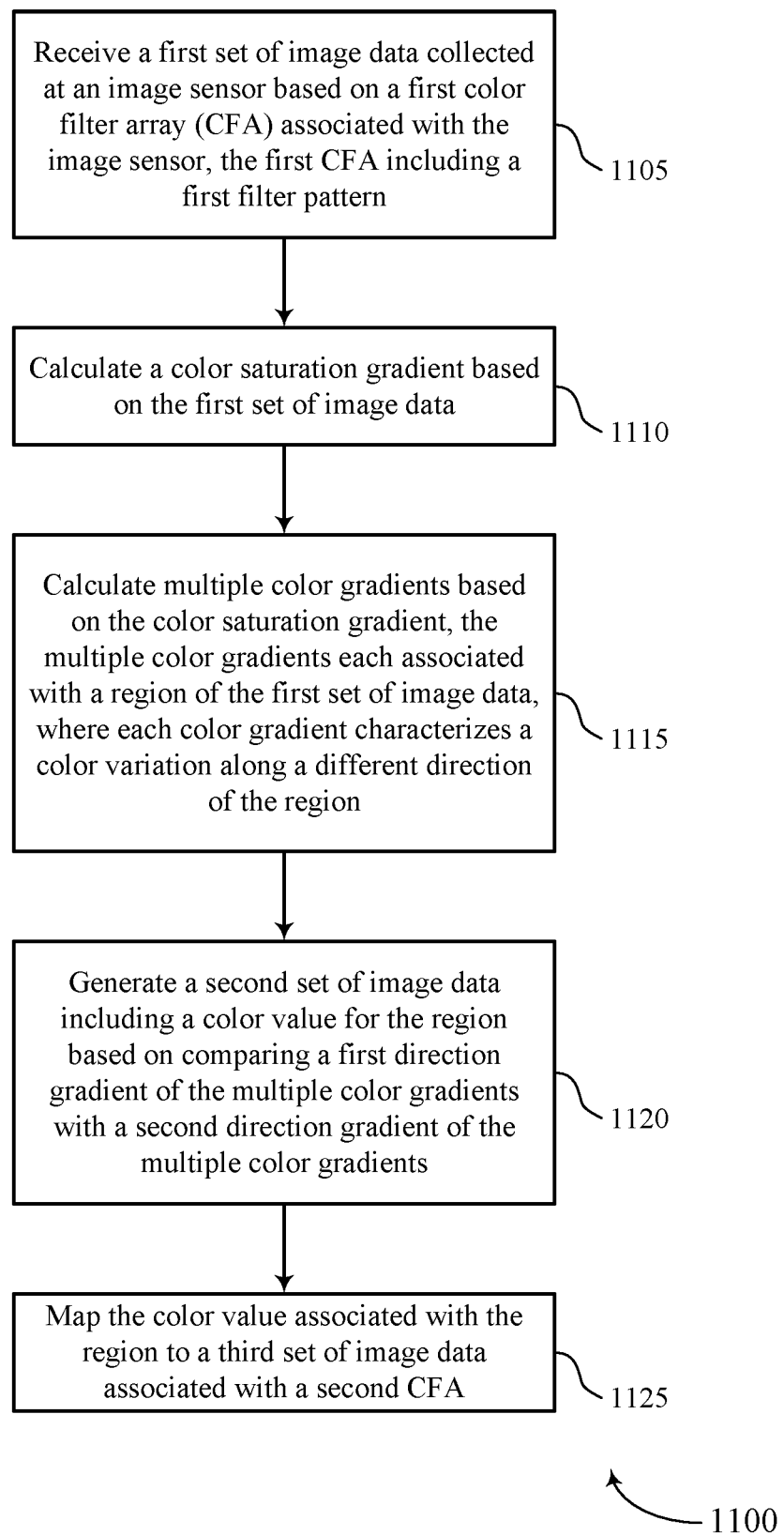
FIGS. 11 and 12 show flowcharts illustrating methods that support techniques for image processing in accordance with aspects of the present disclosure.

FIG. 11 shows a flowchart illustrating a method 1100 that supports techniques for image processing in accordance with aspects of the present disclosure. The operations of method 1100 may be implemented by an ISP 115 or its components as described herein. For example, the operations of method 1100 may be performed by an image processing component as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1105, the ISP may receive a first set of image data collected at an image sensor based on a first color filter array (CFA) associated with the image sensor, the first CFA including a first filter pattern. The operations of 1105 may be performed according to the methods described herein. In some examples, aspects of the operations of 1105 may be performed by a data input component as described with reference to FIGS. 7 through 10.

At 1110, the ISP may calculate a color saturation gradient based on the first set of image data. The operations of 1110 may be performed according to the methods described herein. In some examples, aspects of the operations of 1110 may be performed by a direction detection component as described with reference to FIGS. 7 through 10.

At 1115, the ISP may calculate multiple color gradients based on the color saturation gradient, the multiple color gradients each associated with a region of the first set of image data, where each color gradient characterizes a color variation along a different direction of the region. The operations of 1115 may be performed according to the methods described herein. In some examples, aspects of the operations of 1115 may be performed by a direction detection component as described with reference to FIGS. 7 through 10.

At 1120, the ISP may generate a second set of image data including a color value for the region based on comparing a first direction gradient of the multiple color gradients with a second direction gradient of the multiple color gradients. The operations of 1120 may be performed according to the methods described herein. In some examples, aspects of the operations of 1120 may be performed by an interpolation component as described with reference to FIGS. 7 through 10.

At 1125, the ISP may map the color value associated with the region to a third set of image data associated with a second CFA. The operations of 1125 may be performed according to the methods described herein. In some examples, aspects of the operations of 1125 may be performed by a sampling module as described with reference to FIGS. 7 through 10.

Figure 12:
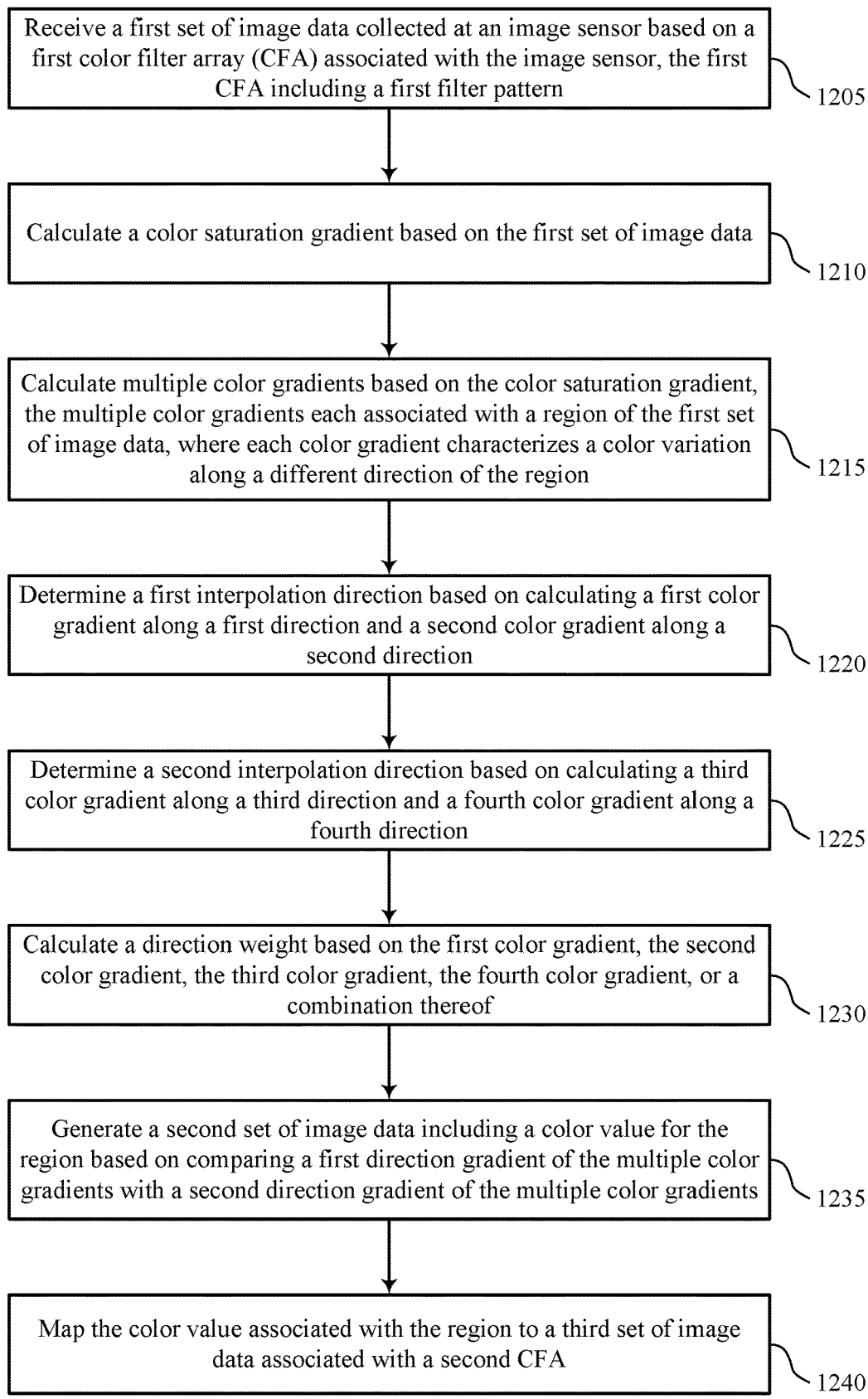

FIG. 12 shows a flowchart illustrating a method 1200 that supports techniques for image processing in accordance with aspects of the present disclosure. The operations of method 1200 may be implemented by an ISP 115 or its components as described herein. For example, the operations of method 1200 may be performed by an image processing component as described with reference to FIGS. 7 through 10. In some examples, an ISP may execute a set of instructions to control the functional elements of the ISP to perform the functions described herein. Additionally or alternatively, an ISP may perform aspects of the functions described herein using special-purpose hardware.

At 1205, the ISP may receive a first set of image data collected at an image sensor based on a first color filter array (CFA) associated with the image sensor, the first CFA including a first filter pattern. The operations of 1205 may be performed according to the methods described herein. In some examples, aspects of the operations of 1205 may be performed by a data input component as described with reference to FIGS. 7 through 10.

At 1210, the ISP may calculate a color saturation gradient based on the first set of image data. The operations of 1210 may be performed according to the methods described herein. In some examples, aspects of the operations of 1210 may be performed by a direction detection component as described with reference to FIGS. 7 through 10.

At 1215, the ISP may calculate multiple color gradients based on the color saturation gradient, the multiple color gradients each associated with a region of the first set of image data, where each color gradient characterizes a color variation along a different direction of the region. The operations of 1215 may be performed according to the methods described herein. In some examples, aspects of the operations of 1215 may be performed by a direction detection component as described with reference to FIGS. 7 through 10.

At 1220, the ISP may determine a first interpolation direction based on calculating a first color gradient along a first direction and a second color gradient along a second direction. The operations of 1220 may be performed according to the methods described herein. In some examples, aspects of the operations of 1220 may be performed by a direction detection component as described with reference to FIGS. 7 through 10.

At 1225, the ISP may determine a second interpolation direction based on calculating a third color gradient along a third direction and a fourth color gradient along a fourth direction. The operations of 1225 may be performed according to the methods described herein. In some examples, aspects of the operations of 1225 may be performed by a direction detection component as described with reference to FIGS. 7 through 10.

At 1230, the ISP may calculate a direction weight based on the first color gradient, the second color gradient, the third color gradient, the fourth color gradient, or a combination thereof. The operations of 1230 may be performed according to the methods described herein. In some examples, aspects of the operations of 1230 may be performed by a direction detection component as described with reference to FIGS. 7 through 10.

At 1235, the ISP may generate a second set of image data including a color value for the region based on comparing a first direction gradient of the multiple color gradients with a second direction gradient of the multiple color gradients. The operations of 1235 may be performed according to the methods described herein. In some examples, aspects of the operations of 1235 may be performed by an interpolation component as described with reference to FIGS. 7 through 10.

At 1240, the ISP may map the color value associated with the region to a third set of image data associated with a second CFA. The operations of 1240 may be performed according to the methods described herein. In some examples, aspects of the operations of 1240 may be performed by a sampling module as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for processing color information, comprising:
    receiving a first set of image data collected at an image sensor based at least in part on a first color filter array (CFA) associated with the image sensor, the first CFA comprising a first filter pattern;
    calculating a color saturation gradient based at least in part on the first set of image data;
    calculating multiple color gradients based at least in part on the color saturation gradient, the multiple color gradients each associated with a region of the first set of image data, wherein each color gradient characterizes a color variation along a different direction of the region;
    generating a second set of image data comprising a color value for the region based at least in part on comparing a first direction gradient of the multiple color gradients with a second direction gradient of the multiple color gradients; and
    mapping the color value associated with the region to a third set of image data associated with a second CFA.

2. The method of claim 1, wherein calculating the color saturation gradient further comprises:
    determining an average color value within a kernel for a first color, a second color, a third color or a combination thereof.

3. The method of claim 1, wherein calculating the multiple color gradients further comprises:
    determining a first interpolation direction based at least in part on calculating a first color gradient along a first direction and a second color gradient along a second direction;
    determining a second interpolation direction based at least in part on calculating a third color gradient along a third direction and a fourth color gradient along a fourth direction; and
    calculating a direction weight based at least in part on the first color gradient, the second color gradient, the third color gradient, the fourth color gradient, or a combination thereof.

4. The method of claim 3, wherein generating the second set of image data further comprises:
    calculating the color value for a first color associated with the region based at least in part on a first set of color values along the first interpolation direction, a second set of color values along the second interpolation direction and the direction weight.

5. The method of claim 3, wherein generating the second set of image data further comprises:
    calculating a second color value for a second color associated with the region based at least in part on a third set of color values along the first interpolation direction.

6. The method of claim 3, further comprising:
    calculating a flatness value associated with the region based at least in part on comparing the first color gradient, the second color gradient, the third color gradient, the fourth color gradient, or a combination thereof;
    defining whether the region is in a flat area based at least in part on comparing the flatness value to a flatness threshold; and
    generating the color value for the region based at least in part on determining the region is in a flat area.

7. The method of claim 6, further comprising:
    performing a non-directional interpolation for the region based at least in part on determining that the flatness value is less than the flatness threshold.

8. The method of claim 7, wherein:
    non-directional interpolation comprises averaging values of pixels for a first color within a kernel.

9. The method of claim 1, wherein the mapping is based at least in part on a filter color of the second CFA associated with the region.

10. The method of claim 9, wherein:
    the second CFA is a Bayer pattern; and
    mapping the color value associated with the region to the third set of image data further comprises interpolating a first color value, a second color value, a third color value, or a combination thereof associated with the region to the third set of image data based at least in part on the filter color of the Bayer pattern.

11. The method of claim 10, further comprising:
    outputting the third set of image data as a Bayer pattern CFA, wherein each region of the third set of image data comprises a color value corresponding to a color specified for that region by the Bayer pattern CFA.

12. An apparatus for processing color information, comprising:
    an image sensor;
    a processor,
    memory in electronic communication with the processor; and
    instructions stored in the memory and executable by the processor to cause the apparatus to:
        receive a first set of image data collected at the image sensor based at least in part on a first color filter array (CFA) associated with the image sensor, the first CFA comprising a first filter pattern;
        calculate a color saturation gradient based at least in part on the first set of image data;
        calculate multiple color gradients based at least in part on the color saturation gradient, the multiple color gradients each associated with a region of the first set of image data, wherein each color gradient characterizes a color variation along a different direction of the region;

generate a second set of image data comprising a color value for the region based at least in part on comparing a first direction gradient of the multiple color gradients with a second direction gradient of the multiple color gradients; and map the color value associated with the region to a third set of image data associated with a second CFA.

13. The apparatus of claim 12, wherein the instructions to calculate the color saturation gradient further are executable by the processor to cause the apparatus to:

determine an average color value within a kernel for a first color, a second color, a third color or a combination thereof.

14. The apparatus of claim 12, wherein the instructions to calculate the multiple color gradients further are executable by the processor to cause the apparatus to:

determine a first interpolation direction based at least in part on calculating a first color gradient along a first direction and a second color gradient along a second direction;

determine a second interpolation direction based at least in part on calculating a third color gradient along a third direction and a fourth color gradient along a fourth direction; and calculate a direction weight based at least in part on the first color gradient, the second color gradient, the third color gradient, the fourth color gradient, or a combination thereof.

15. The apparatus of claim 14, wherein the instructions to generate the second set of image data further are executable by the processor to cause the apparatus to:

calculate the color value for a first color associated with the region based at least in part on a first set of color values along the first interpolation direction, a second set of color values along the second interpolation direction and the direction weight.

16. The apparatus of claim 14, wherein the instructions to generate the second set of image data further are executable by the processor to cause the apparatus to:

calculate a second color value for a second color associated with the region based at least in part on a third set of color values along the first interpolation direction.

17. The apparatus of claim 14, wherein the instructions are further executable by the processor to cause the apparatus to:

calculate a flatness value associated with the region based at least in part on comparing the first color gradient, the second color gradient, the third color gradient, the fourth color gradient, or a combination thereof;

define whether the region is in a flat area based at least in part on comparing the flatness value to a flatness threshold; and generate the color value for the region based at least in part on determining the region is in a flat area.

18. The apparatus of claim 17, wherein the instructions are further executable by the processor to cause the apparatus to:

perform a non-directional interpolation for the region based at least in part on determining that the flatness value is less than the flatness threshold, wherein the non-directional interpolation comprises averaging values of pixels for a first color within a kernel.

19. The apparatus of claim 12, wherein:

the mapping is based at least in part on a filter color of the second CFA associated with the region; and the second CFA is a Bayer pattern.

20. A non-transitory computer-readable medium storing code for processing color information, the code comprising instructions executable by a processor to:

receive a first set of image data collected at an image sensor based at least in part on a first color filter array (CFA) associated with the image sensor, the first CFA comprising a first filter pattern;

calculate a color saturation gradient based at least in part on the first set of image data;

calculate multiple color gradients based at least in part on the color saturation gradient, the multiple color gradients each associated with a region of the first set of image data, wherein each color gradient characterizes a color variation along a different direction of the region;

generate a second set of image data comprising a color value for the region based at least in part on comparing a first direction gradient of the multiple color gradients with a second direction gradient of the multiple color gradients; and map the color value associated with the region to a third set of image data associated with a second CFA.

* * * * *